United States Patent
Steinbach et al.

(10) Patent No.: US 11,258,074 B2
(45) Date of Patent: Feb. 22, 2022

(54) PT—NI—IR CATALYST FOR FUEL CELL

(71) Applicant: 3M INNOVATIVE PROPERTIES COMPANY, St. Paul, MN (US)

(72) Inventors: Andrew J. L. Steinbach, Shoreview, MN (US); Amy E. Hester, Hudson, WI (US); Dennis F. Van Der Vliet, Lubbock, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 280 days.

(21) Appl. No.: 16/344,765

(22) PCT Filed: Oct. 11, 2017

(86) PCT No.: PCT/US2017/056101
§ 371 (c)(1),
(2) Date: Apr. 24, 2019

(87) PCT Pub. No.: WO2018/080792
PCT Pub. Date: May 3, 2018

(65) Prior Publication Data
US 2019/0280309 A1 Sep. 12, 2019

Related U.S. Application Data

(60) Provisional application No. 62/413,165, filed on Oct. 26, 2016.

(51) Int. Cl.
*H01M 8/10* (2016.01)
*H01M 4/92* (2006.01)
(Continued)

(52) U.S. Cl.
CPC ........... *H01M 4/921* (2013.01); *B01J 23/892* (2013.01); *H01M 4/8605* (2013.01);
(Continued)

(58) Field of Classification Search
None
See application file for complete search history.

(56) References Cited

U.S. PATENT DOCUMENTS

| 3,637,437 A | 1/1972 | Goldberger |
| 4,340,276 A | 7/1982 | Maffitt |

(Continued)

FOREIGN PATENT DOCUMENTS

| CN | 102534742 | 7/2012 |
| WO | WO 2010-138138 | 12/2010 |

(Continued)

OTHER PUBLICATIONS

Caldwell, "Spectroscopic in situ Measurements of the Relative Pt Skin Thicknesses and Porosities of Dealloyed PtMn (Ni, Co) Electrocatalysts", The Journal of Physical Chemistry C, Dec. 2014, vol. 119, No. 1, pp. 757-765.

(Continued)

*Primary Examiner* — Tracy M Dove

(57) ABSTRACT

Nanoporous oxygen reduction catalyst material comprising PtNiIr, the catalyst material preferably having the formula $Pt_xNi_yIr_z$, wherein x is in a range from 26.6 to 47.8, y is in a range from 48.7 to 70, and z is in a range from 1 to 11.4. The nanoporous oxygen reduction catalyst material is useful, for example, in fuel cell membrane electrode assemblies.

6 Claims, 14 Drawing Sheets

(51) Int. Cl.
  *H01M 4/88* (2006.01)
  *B01J 23/89* (2006.01)
  *H01M 4/86* (2006.01)
  *H01M 4/98* (2006.01)

(52) U.S. Cl.
  CPC ....... *H01M 4/8871* (2013.01); *H01M 4/8878* (2013.01); *H01M 4/8882* (2013.01); *H01M 4/98* (2013.01); *H01M 8/10* (2013.01); *H01M 4/925* (2013.01); *H01M 2008/1095* (2013.01)

(56) References Cited

U.S. PATENT DOCUMENTS

| | | |
|---|---|---|
| 4,447,506 A | 5/1984 | Luczak |
| 4,568,598 A | 2/1986 | Bilkadi |
| 4,812,352 A | 3/1989 | Debe |
| 5,039,561 A | 8/1991 | Debe |
| 5,068,161 A | 11/1991 | Keck |
| 5,338,430 A | 8/1994 | Parsonage |
| 5,759,944 A | 6/1998 | Buchanan |
| 5,879,827 A | 3/1999 | Debe |
| 5,879,828 A | 3/1999 | Debe |
| 6,040,077 A | 3/2000 | Debe |
| 6,136,412 A | 10/2000 | Spiewak |
| 6,319,293 B1 | 11/2001 | Debe |
| 6,805,972 B2 | 10/2004 | Erlebacher |
| 7,419,741 B2 | 9/2008 | Vernstrom |
| 7,901,829 B2 | 3/2011 | Debe |
| 8,673,773 B2 | 3/2014 | Oppermann |
| 8,748,330 B2 | 6/2014 | Debe |
| 8,895,206 B2 | 11/2014 | Erlebacher |
| 2002/0004453 A1 | 1/2002 | Haugen |
| 2002/0146614 A1* | 10/2002 | Norskov ............... B01J 23/46 429/524 |
| 2004/0048466 A1 | 3/2004 | Gore |
| 2007/0031722 A1 | 2/2007 | Adzic |
| 2009/0127094 A1 | 5/2009 | Botte |
| 2009/0145772 A1 | 6/2009 | Zhang |
| 2009/0291848 A1 | 11/2009 | Biener |
| 2010/0047668 A1 | 2/2010 | Steinbach |
| 2010/0304268 A1 | 12/2010 | Kawamura |
| 2014/0154609 A1* | 6/2014 | Yoo ...................... H01M 4/926 429/482 |
| 2014/0171290 A1 | 6/2014 | Lopez |
| 2014/0246304 A1 | 9/2014 | Debe |
| 2015/0065341 A1 | 3/2015 | Erlebacher |
| 2015/0311536 A1 | 10/2015 | Atanasoska |
| 2016/0288102 A1 | 10/2016 | Stamenkovic |
| 2019/0273265 A1* | 9/2019 | Steinbach ............... H01M 4/98 |

FOREIGN PATENT DOCUMENTS

| | | |
|---|---|---|
| WO | WO 2018-080791 | 5/2018 |
| WO | WO 2018-080793 | 5/2018 |
| WO | WO 2018-080794 | 5/2018 |

OTHER PUBLICATIONS

Chow, "Fabrication of Biologically Based Microstructure Composites for Vacuum Field Emission", Materials Science and Engineering, A158, Oct. 1992, vol. 158, No. 1, pp. 1-6.
Cui, "Large scale restructuring of porous Pt—Ni nanoparticle tubes for methanol oxidation: A highly reactive, stable, and restorable fuel cell catalyst", Chemical Science, May 2011, vol. 2—No. 8, pp. 1611-1614.
Debe, "Effect of Gravity on Copper Phthalocyanine Thin Films III: Microstructure Comparisons of Copper Phthalocyanine Thin Films Grown in Microgravity and Unit Gravity", Thin Solid Films, 1990, vol. 186, pp. 327-347.
Debe, "Vacuum Vapor Deposited Thin Films of a Perylene Dicarboximide Derivative: Microstructure Versus Deposition Parameters", Journal of Vacuum Science and Technology, May/Jun. 1988, vol. 6, No. 3, pp. 1907-1911.
Erlebacher, "Evolution of Nanoporosity in Dealloying", Letters to Nature, Mar. 2001, vol. 410, pp. 450-453.
Jayasayee, "Influence of chloride ions on the stability of PtNi alloys for PEMFC cathode", Electrochimica Acta, Aug. 2011, vol. 56, No. 20, pp. 7235-7242.
Jayasayee, "Oxygen reduction reaction (ORR) activity and durability of carbon supported PtM (Co, Ni, Cu) alloys: Influence of particle size and non-noble metals", Applied Catalysis B: Environmental, Jan. 2012, vol. 111-112, pp. 515-526.
Jeon, "Effect of de-alloying of Pt—Ni bimetallic nanoparticles on the oxygen reduction reaction", Electrochemistry Communications, Dec. 2010, vol. 12, No. 12, pp. 1796-1799.
Johnson, "In Situ Reactivity and TOF-SIMS Analysis of Surfaces Prepared by Soft and Reactive Landing of Mass-Selected Ions", Analytical Chemistry, 2010, vol. 82, No. 13, pp. 5718-5727.
Johnson, "Preparation of Surface Organometallic Catalysts by Gas-Phase Ligand Stripping and Reactive Landing of Mass-Selected Ions", Chemistry: A European Journal, 2010, vol. 16, No. 48, pp. 14433-14438.
Kam, "Summary Abstract: Dramatic variation of the physical microstructure of a vapor deposited organic thin film", Journal of Vacuum Science & Technology A, Jul. 1987, vol. 5, No. 4, pp. 1914-1916.
Kang, "Multimetallic Core/Interlayer/Shell Nanostructures as Advanced Electrocatalysts", Nano Letters, Oct. 2014, vol. 14, No. 11, pp. 6361-6367.
Kang, "PtNiAu trimetallic nanoalloys enabled by a digestive-assisted process as highly efficient catalyst for hydrogen generation", Nano Energy, Mar. 2016, vol. 23, pp. 145-152.
Lee, "Measurement and Modeling of the Reflectance-Reducing Properties of Gradient Index Microstructured Surfaces", Photographic Science and Engineering, Jul./Aug. 1980, vol. 24, No. 4, pp. 211-216.
Li, "A dramatic increase in the strength of a nanoporous Pt—Ni alloy induced by annealing", Scripta Materialia, Dec. 2010, vol. 63-12, pp. 1169-1172.
Li, "Synthesis and characterization of nanoporous Pt—Ni alloys", Applied Physics Letters, Nov. 2009, vol. 95, No. 20, pp. 201902-1-201902-3.
Liu, "Microstructure, electrocatalytic and sensing properties of nanoporous Pt46Ni54 alloy nanowires fabricated by mild dealloying", Journal of Materials Chemistry, May 2010, vol. 20, No. 27, pp. 5621-5627.
Ohnuma, "Amorphous Ultrafine Metallic Particles Prepared by Sputtering Method", Proceedings of the Fifth International Conference on Rapidly Quenched Metals, Sep. 1984, pp. 1117-1124.
Sadaoka, "Effects of morphology on NO2 detection in air at room temperature with phthalocyanine thin films", Journal of Materials Science, 1990, vol. 25, pp. 5257-5268.
Shui, "Making Pt-shell Pt30Ni70 nanowires by mild dealloying and heat treatments with little Ni loss", Journal of Materials Chemistry, Mar. 2011, vol. 21, No. 17, pp. 6225-6229.
Synder, "Structure/Processing/Properties Relationships in Nanoporous Nanoparticles as Applied to Catalysis of the Cathodic Oxygen Reduction Reaction", Journal of the American Chemical Society, Apr. 2012, vol. 134, No. 20, pp. 8633-8645.
Tang, "High dispersion and electrocatalytic properties of platinum on well-aligned carbon nanotube arrays", Carbon, 2004, vol. 42, pp. 191-197.
Tovar, "Dealloying of platinum-based alloy catalysts: Kinetic Monte Carlo simulations", Electrochimica Acta, Jul. 2013, vol. 101, pp. 326-333.
Vliet, "Mesostructured thin films as electrocatalysts with tunable composition and surface morphology", Nature Materials, Nov. 2012, vol. 11, No. 12, pp. 1051-1058.
Wang, "Nanoporous surface alloys as highly active and durable oxygen reduction reaction electrocatalysts", Platinum Metals Review, Jul. 2012, vol. 56, No. 3, p. 207.
Wang, "Structurally ordered intermetallic platinum-cobalt core-shell nanoparticles with enhanced activity and stability as oxygen reduction electrocatalysts", Nature Materials, Oct. 2012, vol. 12, No. 1, pp. 81-87.

(56) References Cited

OTHER PUBLICATIONS

Yamauchi, "Synthesis and characterization of mesoporous Pt—Ni (HI—Pt/Ni) alloy particles prepared from lyotropic liquid crystalline media", Journal of Materials Chemistry, May 2006, vol. 16—No. 23, pp. 2229-2234.
Zhang, "Platinum Monolayer on Nonnoble Metal-Noble Metal Core-Shell Nanoparticle Electrocatalysts for O2 Reduction", The Journal of Physical Chemistry B, Nov. 2005, vol. 109, No. 48, pp. 22701-22704.
International Search Report for PCT International Application No. PCT/US2017/056094, dated Nov. 27, 2017, 6 pages.
International Search Report for PCT International Application No. PCT/US2017/056101, dated Nov. 24, 2017, 6 pages.
International Search Report for PCT International Application No. PCT/US2017/056103, dated Dec. 15, 2017, 4 pages.
International Search Report for PCT International Application No. PCT/US2017/056110, dated Dec. 11, 2017, 5 pages.

\* cited by examiner

PT—NI—IR CATALYST FOR FUEL CELL

CROSS REFERENCE TO RELATED APPLICATION

This application is a national stage filing under 35 U.S.C. 371 of PCT/US2017/056101, filed Oct. 11, 2017, which claims the benefit of U.S. Provisional Application No. 62/413165, filed Oct. 26, 2016, the disclosure of which is incorporated by reference in its/their entirety herein.

BACKGROUND

Fuel cells produce electricity via electrochemical oxidation of a fuel and reduction of an oxidant. Fuel cells are generally classified by the type of electrolyte and the type of fuel and oxidant reactants. One type of fuel cell is a polymer electrolyte membrane fuel cell (PEMFC), where the electrolyte is a polymeric ion conductor and the reactants are hydrogen fuel and oxygen as the oxidant. The oxygen is often provided from the ambient air.

PEMFCs typically require the use of electrocatalysts to improve the reaction rate of the hydrogen oxidation reaction (HOR) and oxygen reduction reactions (ORR), which improves the PEMFC performance. PEMFC electrocatalysts often comprise platinum, a relatively expensive precious metal. It is typically desirable to minimize the platinum content in PEMFC devices to minimize cost. Sufficient platinum content, however, is needed to provide sufficient catalytic activity and PEMFC device performance. As such, there is a desire to increase the catalyst activity per unit catalyst mass (mass activity). There are two general approaches to increase the mass activity, namely increasing the catalyst activity per unit catalyst surface area (specific activity) and increasing the catalyst surface area per catalyst mass (specific surface area or specific area). The HOR and ORR occur on the catalyst surface, so increasing the specific surface area and/or the specific activity can reduce the amount of catalyst needed to achieve a desired absolute performance, reducing cost.

To maximize specific area, PEMFC electrocatalysts are often in the form of nanometer-scale thin films or particles on support materials. An exemplary support material for nanoparticle PEMFC electrocatalysts is carbon black, and an exemplary support material for thin film electrocatalysts is whiskers.

To increase the specific activity, PEMFC Pt ORR electrocatalysts often also comprise certain transition metals such as cobalt or nickel. Without being bound by theory, incorporation of certain transition metals into the Pt lattice is believed to induce contraction of the Pt atoms at the catalyst surface, which increases the kinetic reaction rate by modification of the molecular oxygen binding and dissociation energies and the binding energies of reaction intermediates and/or spectator species.

PEMFC electrocatalysts may incorporate other precious metals. For example, HOR PEMFC Pt electrocatalysts can be alloyed with ruthenium to improve tolerance to carbon monoxide, a known Pt catalyst poison. HOR and ORR PEMFC electrocatalysts may also incorporate iridium to facilitate improved activity for the oxygen evolution reaction (OER). Improved OER activity may improve the durability of the PEMFC under inadvertent operation in the absence of fuel and during PEMFC system startup and shutdown. Incorporation of iridium into the PEMFC ORR electrocatalyst, however, may result in decreased mass activity and higher catalyst cost. Iridium has relatively lower specific activity for ORR than platinum, potentially resulting in decreased mass activity. Iridium is also a precious metal, and thereby its incorporation can increase cost. As such, the amount of iridium incorporated into PEMFC ORR electrocatalysts should balance the improved OER activity and decreased ORR activity.

PEMFC electrocatalysts may have different structural and compositional morphologies. The structural and compositional morphologies are often tailored through specific processing methods during the electrocatalyst fabrication, such as variations in the electrocatalyst deposition method and annealing methods. PEMFC electrocatalysts can be compositionally homogenous, compositionally layered, or may contain composition gradients throughout the electrocatalyst. Tailoring of composition profiles within the electrocatalyst may improve the activity and durability of electrocatalysts. PEMFC electrocatalyst particles or nanometer-scale films may have substantially smooth surfaces or have atomic- or nanometer-scale roughness. PEMFC electrocatalysts may be structurally homogenous or may be nanoporous, being comprised of nanometer-scale pores and solid catalyst ligaments.

As compared to structurally homogenous electrocatalysts, nanoporous PEMFC electrocatalysts may have higher specific area, thereby reducing cost. Nanoporous catalysts are comprised of numerous interconnected nanoscale catalyst ligaments, and the surface area of a nanoporous material depends upon the diameter and volumetric number density of the nanoscale ligaments. Surface area is expected to increase as the nanoscale ligaments diameter decreases and the volumetric number density increases.

One method of forming nanoporous PEMFC electrocatalysts is via dealloying of a transition metal rich Pt alloy precursor, such as a PtNi alloy with 30 at. % Pt and 70 at. % Ni. During dealloying, the precursor is exposed to conditions where the transition metal is dissolved and the surface Pt has sufficient mobility to allow exposure of subsurface transition metal and formation of nanoscale ligaments which separate the nanopores. Dealloying to form nanopores can be induced via free corrosion approaches, such as exposure to acid, or via exposure to repeated electrochemical oxidation and reduction cycles. Electrocatalyst nanopore formation may occur spontaneously during electrochemical operation within a PEMFC, or may occur via ex-situ processing prior to PEMFC operation.

In PEMFC devices, electrocatalysts may lose performance over time, due to a variety of degradation mechanisms which induce structural and compositional changes. Such performance loss may shorten the practical lifetime of such systems. Electrocatalyst degradation may occur, for example, due to loss of electrocatalyst activity per unit surface area and loss of electrocatalyst surface area. Electrocatalyst specific activity may be lost, for example, due to the dissolution of electrocatalyst alloying elements. Non-porous nanoparticle and nano-scale thin films may lose surface area, for example, due to Pt dissolution, particle sintering, and loss of surface roughness. Nanoporous electrocatalysts may additionally lose surface area, for example, due to increased nanoscale ligament diameter and decreased nanoscale ligament density.

Additional electrocatalysts and systems containing such catalysts are desired, including those that address one or more of the issues discussed above.

SUMMARY

In one aspect, the present disclosure provides a nanoporous oxygen reduction catalyst material comprising PtNiIr.

In some embodiments, the nanoporous oxygen reduction catalyst material has the formula $Pt_xNi_yIr_z$, wherein x is in a range from 26.6 to 47.8, y is in a range from 48.7 to 70, and z is in a range from 1 to 11.4 (in some embodiments, x is in a range from 26.6 to 47.6, y is in a range from 48.7 to 69.3, and z is in a range from 1 to 11.4; x is in a range from 26.6 to 30, y is in a range from 17 to 62, and z is in a range from 1 to 11.4; or even x is in a range from 47.6 to 47.8, y is in a range from 48.7 to 52.2, and z is in a range from 0 to 3.7; or even in one exemplary embodiment, x is 28.1, y is 64.9, and z is 7.0). In some embodiments, the catalyst material functions as an oxygen reduction catalyst material.

In some embodiments, the nanoporous oxygen reduction catalyst material has pores with diameters in a range from 1 nm to 10 nm (in some embodiments, in a range from 2 nm to 8 nm, or even 3 nm to 7 nm).

In some embodiments, nanoporous oxygen reduction catalyst material described herein has been annealed.

Surprisingly, Applicants discovered the addition of iridium to nanoporous PtNi catalyst can substantially improve retention of mass activity, specific area, and/or performance after accelerated electrocatalyst aging. Iridium was observed to improve the durability whether incorporated into the bulk of the catalysts or at the surface of the catalysts, whether incorporated into or at the surface of the catalyst before or after annealing, and whether incorporated into or at the surface of the catalyst before or after nanoporosity was formed via dealloying.

Nanoporous oxygen reduction catalyst materials described herein are useful, for example, in fuel cell membrane electrode assemblies. For example, a catalyst used in a fuel cell membrane electrode assembly may comprise nanostructured elements comprising microstructured support whiskers having an outer surface at least partially covered by the nanoporous oxygen reduction catalyst material described herein.

DETAILED DESCRIPTION

Figure 1:
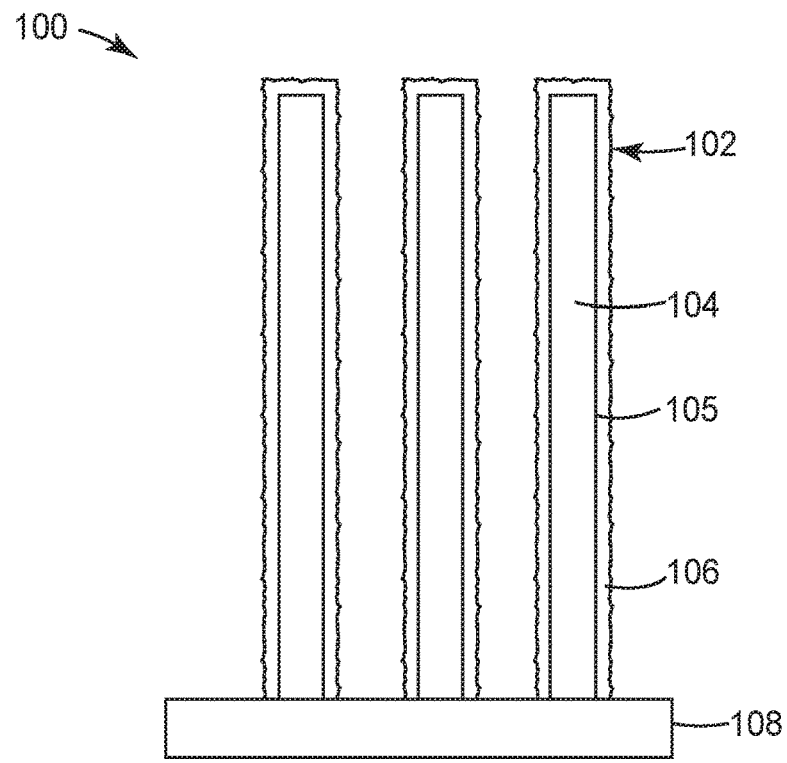
FIG. 1 is a side view of an exemplary catalyst described herein.

Referring to FIG. 1, exemplary catalyst 100 on substrate 108 has nanostructured elements 102 with microstructured whiskers 104 having outer surface 105 at least partially covered by nanoporous oxygen reduction catalyst material 106 comprising PtNiIr.

One exemplary method for making nanoporous oxygen reduction catalyst material described herein comprises:

providing an oxygen reduction catalyst material comprising PtNiIr, wherein there are layers comprising platinum and nickel; and dealloying at least some layers comprising platinum and nickel to remove nickel from at least one layer to provide a nanoporous oxygen reduction catalyst material described herein.

Another exemplary method for making nanoporous oxygen reduction catalyst material described herein comprises:

depositing platinum and nickel from a target comprising platinum and nickel to provide a first layer comprising platinum and nickel;

depositing a layer comprising iridium from a target comprising iridium;

repeating the preceding two steps, in order, at least once (in some embodiments, repeating 2, 3, 4, 5, 10, 15, 20, 25, 50, 75, 100, 150, 200, 250, or even at least 275 times); and dealloying at least one layer comprising platinum and nickel to remove nickel from the layer to provide a nanoporous oxygen reduction catalyst material described herein.

Figure 1A:
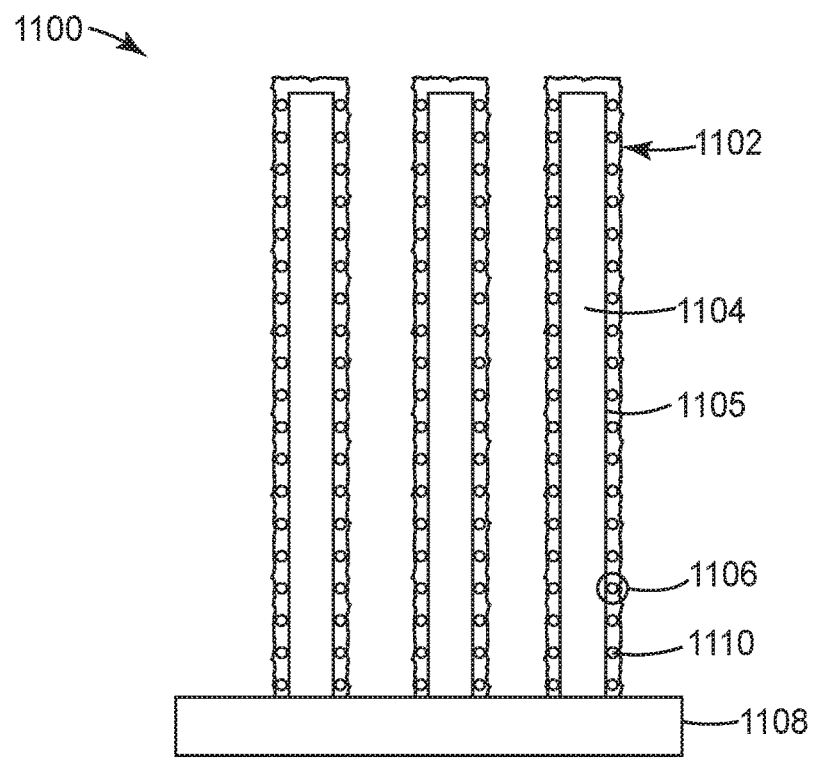
FIG. 1A is a side view of an exemplary catalyst described herein.

Referring to FIG. 1A, in some embodiments, the layer(s) dealloyed is part of a catalyst such as exemplary catalyst 1100 on substrate 1108 having nanostructured elements 1102 with microstructured whiskers 1104 having outer surface 1105 at least partially covered by catalyst material 1106 comprising PtNiIr which has pores 1110.

Suitable whiskers can be provided by techniques known in the art, including those described in U.S. Pat. No. 4,812,352 (Debe), U.S. Pat. No. 5,039,561 (Debe), U.S. Pat. No. 5,338,430 (Parsonage et al.), U.S. Pat. No. 6,136,412 (Spiewak et al.), and U.S. Pat. No. 7,419,741 (Vernstrom et al.), the disclosures of which are incorporated herein by reference. In general, nanostructured whiskers can be provided, for example, by vacuum depositing (e.g., by sublimation) a layer of organic or inorganic material onto a substrate (e.g., a microstructured catalyst transfer polymer sheet), and then, in the case of perylene red deposition, converting the perylene red pigment into nanostructured whiskers by thermal annealing. Typically, the vacuum deposition steps are carried out at total pressures at or below about 10-3 Torr or 0.1 Pascal. Exemplary microstructures are made by thermal sublimation and vacuum annealing of the organic pigment C.I. Pigment Red 149 (i.e., N,N'-di(3,5-xylyl)perylene-3,4:9,10-bis(dicarboximide)). Methods for making organic nanostructured layers are reported, for example, in Materials Science and Engineering, A158 (1992), pp. 1-6; J. Vac. Sci. Technol. A, 5, (4), July/August 1987, pp. 1914-16; J. Vac. Sci. Technol. A, 6, (3), May/August 1988, pp. 1907-11; Thin Solid Films, 186, 1990, pp. 327-47; J. Mat. Sci., 25, 1990, pp. 5257-68; Rapidly Quenched Metals, Proc. of the Fifth Int. Conf. on Rapidly Quenched Metals, Wurzburg, Germany (Sep. 3-7, 1984), S. Steeb et al., eds., Elsevier Science Publishers B.V., New York, (1985), pp. 1117-24; Photo. Sci. and Eng., 24, (4), July/August 1980, pp. 211-16; and U.S. Pat. No. 4,340,276 (Maffitt et al.) and U.S. Pat. No. 4,568,598 (Bilkadi et al.), the disclosures of which are incorporated herein by reference. Properties of catalyst layers using carbon nanotube arrays are reported in the article, "High Dispersion and Electrocatalytic Properties of Platinum on Well-Aligned Carbon Nanotube Arrays", Carbon, 42, (2004), pp. 191-197. Properties of catalyst layers using grassy or bristled silicon are reported, for example, in U.S. Pat. App. Pub. No. 2004/0048466 A1 (Gore et al.).

Figure 4A:
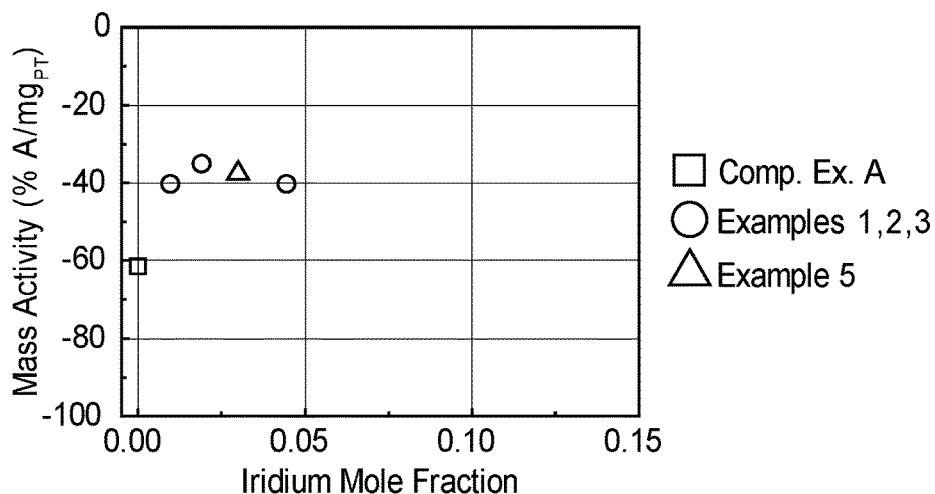
FIG. 4A is a plot of the change in electrocatalyst activity after a durability test, normalized to platinum content, for Examples 1-8 and Comparative Example A.

Vacuum deposition may be carried out in any suitable apparatus (see, e.g., U.S. Pat. No. 5,338,430 (Parsonage et al.), U.S. Pat. No. 5,879,827 (Debe et al.), U.S. Pat. No. 5,879,828 (Debe et al.), U.S. Pat. No. 6,040,077 (Debe et al.), and U.S. Pat. No. 6,319,293 (Debe et al.), and U.S. Pat. App. Pub. No. 2002/0004453 A1 (Haugen et al.), the disclosures of which are incorporated herein by reference. One exemplary apparatus is depicted schematically in FIG. 4A of U.S. Pat. No. 5,338,430 (Parsonage et al.), and discussed in the accompanying text, wherein the substrate is mounted on a drum, which is then rotated over a sublimation or evaporation source for depositing the organic precursor (e.g., perylene red pigment) prior to annealing the organic precursor in order to form the whiskers.

Typically, the nominal thickness of deposited perylene red pigment is in a range from about 50 nm to 500 nm. Typically, the whiskers have an average cross-sectional dimension in a range from 20 nm to 60 nm and an average length in a range from 0.3 micrometer to 3 micrometers.

In some embodiments, the whiskers are attached to a backing. Exemplary backings comprise polyimide, nylon, metal foils, or other material that can withstand the thermal annealing temperature up to 300° C. In some embodiments, the backing has an average thickness in a range from 25 micrometers to 125 micrometers.

In some embodiments, the backing has a microstructure on at least one of its surfaces. In some embodiments, the microstructure is comprised of substantially uniformly shaped and sized features at least three (in some embodiments, at least four, five, ten, or more) times the average size of the whiskers. The shapes of the microstructures can, for example, be V-shaped grooves and peaks (see, e.g., U.S. Pat. No. 6,136,412 (Spiewak et al.), the disclosure of which is incorporated herein by reference) or pyramids (see, e.g., U.S. Pat. No. 7,901,829 (Debe et al.), the disclosure of which is incorporated herein by reference). In some embodiments, some fraction of the microstructure features extend above the average or majority of the microstructured peaks in a periodic fashion, such as every 31st V-groove peak being 25% or 50% or even 100% taller than those on either side of it. In some embodiments, this fraction of features that extends above the majority of the microstructured peaks can be up to 10% (in some embodiments up to 3%, 2%, or even up to 1%). Use of the occasional taller microstructure features may facilitate protecting the uniformly smaller microstructure peaks when the coated substrate moves over the surfaces of rollers in a roll-to-roll coating operation. The occasional taller feature touches the surface of the roller rather than the peaks of the smaller microstructures, so much less of the nanostructured material or whisker material is likely to be scraped or otherwise disturbed as the substrate moves through the coating process. In some embodiments, the microstructure features are substantially smaller than half the thickness of the membrane that the catalyst will be transferred to in making a membrane electrode assembly. This is so that during the catalyst transfer process, the taller microstructure features do not penetrate through the membrane where they may overlap the electrode on the opposite side of the membrane. In some embodiments, the tallest microstructure features are less than ⅓rd or ¼th of the membrane thickness. For the thinnest ion exchange membranes (e.g., about 10 micrometers to 15 micrometers in thickness), it may be desirable to have a substrate with microstructured features no larger than about 3 micrometers to 4.5 micrometers tall. The steepness of the sides of the V-shaped or other microstructured features or the included angles between adjacent features may, in some embodiments, be desirable to be on the order of 900 for ease in catalyst transfer during a lamination-transfer process and to have a gain in surface area of the electrode that comes from the square root of two (1.414) surface area of the microstructured layer relative to the planar geometric surface of the substrate backing.

In some embodiments, the catalyst material to be dealloyed comprises a layer comprising platinum and nickel and a layer comprising iridium on the layer comprising platinum and nickel.

In some embodiments, layers of catalyst material to be dealloyed comprising platinum and nickel have a planar equivalent thickness in a range from 0.4 nm to 70 nm (in some embodiments, in a range from 0.4 nm to 10 nm, 0.4 nm to 5 nm, 1 nm to 25 nm, or even 1 nm to 10 nm) and layers comprising iridium have a planar equivalent thickness (i.e., the thickness, if deposited on a substantially flat, planar substrate) in a range from 0.01 nm to 20 nm (in some embodiments, in a range from 0.01 nm to 10 nm, 0.01 nm to 5 nm, 0.02 nm to 2.5 nm, or even 0.02 nm to 1 nm). In some embodiments, layer(s) of catalyst material to be dealloyed comprising platinum and nickel collectively has a planar equivalent thickness up to 600 nm (in some embodiments, up to 575 nm, 550 nm, 500 nm, 400 nm, 300 nm, 200 nm, 100 nm, 75 nm, 50 nm, 25 nm, 10 nm, 5 nm, 2.5 nm, 1 nm, or even up to two monolayers (e.g., 0.4 nm); in some embodiments, in a range from 0.4 nm to 600 nm, 0.4 nm to 500 nm, 1 nm to 500 nm, 5 nm to 500 nm, 10 nm to 500 nm, 10 nm to 400 nm, or even 40 nm to 300 nm) and the layer comprising iridium has a planar equivalent thickness up to 50 nm (in some embodiments, up to 45 nm, 40 nm, 35 nm, 30 nm, 25 nm, 20 nm, 15 nm, 10 nm, 5 nm, 4 nm, 3 nm, 2 nm, 1 nm, a monolayer (e.g., 0.2 nm) or even less than a monolayer (e.g., 0.01 nm); in some embodiments, in a range from 0.01 nm to 50 nm, 1 nm to 50 nm, 5 nm to 40 nm, or even 5 nm to 35 nm).

In some embodiments, catalyst material to be dealloyed comprises alternating layers comprising platinum and nickel and layers comprising iridium (i.e., a layer comprising platinum and nickel, a layer comprising iridium, a layer comprising platinum and nickel, a layer comprising iridium, etc.). In some embodiments, at least 2, 3, 4, 5, 10, 15, 20, 25, 50, 75, 100, 150, 200, 250, or even at least 275 sets of the alternating layers.

The thickness of an individual deposited catalyst layer may depend, for example, on the areal catalyst loading of the layer and the catalyst density. For example, the thickness of a single layer of Pt with 10 micrograms of Pt per $cm^2$ planar area and density of 21.45 $g/cm^3$ deposited onto a planar substrate is calculated as 4.7 nm, and the thickness of a Ni layer with the same areal loading is 11.2 nm.

In some embodiments, catalyst material to be dealloyed comprises a layer comprising platinum, a layer comprising nickel on the layer comprising platinum, and a layer comprising iridium on the layer comprising nickel. In some embodiments, catalyst material to be dealloyed comprises a layer comprising nickel, a layer comprising platinum on the layer comprising nickel, and a layer comprising iridium on the layer comprising platinum. In some embodiments, catalyst material to be dealloyed comprises repeating sequential individual layers of platinum, nickel, and iridium. In some embodiments, at least 2, 3, 4, 5, 10, 15, 20, 25, 50, 75, 100, 150, 200, 250, or even at least 275 sets of the repeating layers.

In some embodiments, catalyst material to be dealloyed has an exposed iridium surface layer.

In some embodiments, each layer of catalyst material to be dealloyed comprising platinum and nickel independently has a planar equivalent thickness up to 100 nm (in some embodiments, up to 50 nm, 20 nm, 15 nm, 10 nm, 5 nm, 4 nm, 3 nm, 2 nm, 1 nm, a monolayer (e.g., 0.2 nm), or even up to less than a monolayer (e.g. 0.01 nm); in some embodiments, in a range from 0.01 nm to 100 nm, 0.01 nm to 50 nm, 0.1 nm to 15 nm, 0.1 nm to 10 nm, or even 1 nm to 5 nm).

In general, catalyst material to be dealloyed can be deposited by techniques known in the art.

Exemplary deposition techniques include those independently selected from the group consisting of sputtering (including reactive sputtering), atomic layer deposition, molecular organic chemical vapor deposition, molecular beam epitaxy, thermal physical vapor deposition, vacuum deposition by electrospray ionization, and pulse laser deposition. Additional general details can be found, for example, in U.S. Pat. No. 5,879,827 (Debe et al.), U.S. Pat. No. 6,040,077 (Debe et al.), and U.S. Pat. No. 7,419,741 (Vernstrom et al.), the disclosures of which are incorporated herein by reference. The thermal physical vapor deposition method uses suitable elevated temperature (e.g., via resistive heating, electron beam gun, or laser) to melt or sublimate the target (source material) into vapor state which is in turn passed through a vacuum space, then condensing of the vaporized form onto substrate surfaces. Thermal physical vapor deposition equipment is known in the art, including that available, for example, as a metal evaporator or as an organic molecular evaporator from CreaPhys GmbH, Dresden, Germany, under the trade designations "METAL EVAPORATOR (ME-SERIES)" or "Organic Molecular Evaporator (DE-SERIES)" respectively; another example of an organic materials evaporator is available from Mantis Deposition LTD, Oxfordshire, UK, under the trade designation "ORGANIC MATERIALS EVAPORATOR (ORMA-SERIES)." Catalyst material to be dealloyed comprising multiple alternating layers can be sputtered, for example, from multiple targets (e.g., Pt is sputtered from a first target, Ni is sputtered from a second target, and Ir from a third, or from a target(s) comprising more than one element (e.g., Pt and Ni)). If the catalyst coating is done with a single target, it may be desirable that the coating layer be applied in a single step onto the gas distribution layer, gas dispersion layer, catalyst transfer layer, or membrane, so that the heat of condensation of the catalyst coating heats the underlying catalyst or support Pt, Ni, or Ir atoms as applicable, and substrate surface is sufficient to provide enough surface mobility that the atoms are well mixed and form thermodynamically stable alloy domains. Alternatively, for example, the substrate can also be provided hot or heated to facilitate this atomic mobility. In some embodiments, sputtering is conducted, at least in part, in an atmosphere comprising argon. Organometallic forms of catalysts can be deposited, for example, by soft or reactive landing of mass-selected ions. Soft landing of mass-selected ions is used to transfer catalytically-active metal complexes, complete with organic ligands, from the gas phase onto an inert surface. This method can be used to prepare materials with defined active sites and thus achieve molecular design of surfaces in a highly-controlled way under either ambient or traditional vacuum conditions. For additional details see, for example, Johnson et al., Anal. Chem., 2010, 82, pp. 5718-5727, and Johnson et al., Chemistry: A European Journal, 2010, 16, pp. 14433-14438, the disclosures of which are incorporated herein by reference.

In some embodiments, the weight ratio of platinum to iridium of the catalyst material before or after dealloying is in a range from 1:1 to 50:1 (in some embodiments, in a range from 2:1 to 40:1).

In some embodiments, methods for making catalyst material that is dealloyed comprise depositing platinum and nickel from a target comprising platinum and nickel (e.g., a $Pt_3Ni_7$ target) and depositing iridium from a target comprising iridium. In some embodiments, layers comprising platinum and nickel have a planar equivalent thickness in a range from 0.4 nm to 580 nm (in some embodiments, in a range from 0.4 nm to 72 nm) and layers comprising iridium have a planar equivalent thickness in a range from 0.01 nm to 32 nm (in some embodiments, in a range from 0.01 nm to 16 nm, or even a range from 0.01 nm to 2 nm).

In some embodiments, methods for making catalyst described herein comprise depositing platinum from a target comprising platinum, depositing nickel from a target comprising nickel, and depositing iridium from a target comprising iridium. In some embodiments, a layer comprising platinum, an adjacent layer comprising nickel, and an adjacent layer comprising iridium collectively having a planar equivalent thickness in a range from 0.5 nm to 50 nm (in some embodiments, in a range from 0.5 nm to 30 nm). In some embodiments, layers comprising platinum have a planar equivalent thickness in a range from 0.2 nm to 30 nm (in some embodiments, in a range from 0.2 nm to 20 nm, or even 0.2 nm to 10 nm), layers comprising nickel have a planar equivalent thickness in a range from 0.2 nm to 50 nm (in some embodiments, in a range from 0.2 nm to 25 nm, or even 0.2 nm to 10 nm) and layers comprising iridium have a planar equivalent thickness in a range from 0.01 nm to 20 nm (in some embodiments, in a range from 0.01 nm to 10 nm, 0.01 nm to 5 nm, 0.02 nm to 5 nm, 0.02 nm to 1 nm, or even 0.1 nm to 1 nm). In some embodiments, the weight ratio of platinum to iridium is in a range from 2.4:1 to 34.3:1 (in some embodiments, in a range from 6.5:1 to 34.3:1, or even 9.7:1 to 34.3:1).

The nanoporosity is typically provided by dealloying the catalyst material to remove a portion of the nickel. In general, dealloying can be accomplished by techniques known in the art, including via "free-corrosion" approaches (e.g., immersion in acid) or via electrochemical processing (e.g. potential cycling in acidic media). Nanoporosity formation typically occurs in alloys comprising at least two components with sufficiently different dissolution rates in the dealloying medium and when the more noble component has sufficient surface mobility. For additional details see, for example, Erlebacher et al., Nature, 2001, 410, pp. 450-453 and U.S. Pat. No. 6,805,972 B2 (Erlebacher et al.); U.S. Pat. No. 8,673,773 B2 (Oppermann et al.); and U.S. Pat. No. 8,895,206 B2 (Erlebacher et al.), the disclosures of which are incorporated herein by reference.

In some embodiments, catalyst material to be dealloyed or the (dealloyed) nanoporous oxygen reduction catalyst material is annealed. In some embodiments, the catalyst material is annealed before dealloying. In general, annealing can be done by techniques known in the art, including heating the catalyst via, for example, an oven or furnace, with a laser, and with infrared techniques. Annealing can be conducted, for example, in inert or reactive gas environments. Although not wanting to be bound by theory, it is believed annealing can induce structural changes on the atomic scale, which can influence activity and durability of catalysts. Further, it is believed annealing nanoscale particles and films can induce mobility in the atomic constituent(s), which can cause growth of particles or thin film grains. In the case of multi-element mixtures, alloys, or layered particles and films, it is believed annealing can induce, for example, segregation of components within the particle or film to the surface, formation of random, disordered alloys, and formation of ordered intermetallics, depending upon the component element properties and the annealing environment. For additional details regarding annealing see, for example, van der Vliet et al., Nature Materials, 2012, 11, pp. 1051-1058; Wang et al., Nature Materials, 2013, 12, pp. 81-87, and U.S. Pat. No. 8,748,330 B2 (Debe et al.), the disclosures of which are incorporated herein by reference.

In some embodiments, nanoporous oxygen reduction catalyst materials described herein are in the form of at least one nanoporous layer comprising platinum and nickel. In some embodiments, nanoporous layers comprising platinum and nickel have a planar equivalent thicknesses (i.e., the thickness if deposited on a substantially flat, planar substrate) up to 600 nm (in some embodiments, up to 575 nm, 550 nm, 500 nm, 400 nm, 300 nm, 200 nm, 100 nm, 75 nm, 50 nm, 25 nm, 10 nm, 5 nm, 2.5 nm, 1 nm, or even up to two monolayers (e.g., 0.4 nm); in some embodiments, in a range from 0.4 nm to 600 nm, 0.4 nm to 500 nm, 1 nm to 500 nm, 5 nm to 500 nm, 10 nm to 500 nm, 10 nm to 400 nm, or even 40 nm to 300 nm).

In some embodiments, nanoporous oxygen reduction catalyst material described herein, there is a layer comprising iridium on at least one of the nanoporous layers comprising platinum and nickel. In some embodiments, the catalyst material has an exposed iridium surface layer. In some embodiments, the layer comprising iridium has a planar equivalent thickness up to 50 nm (in some embodiments, up to 45 nm, 40 nm, 35 nm, 30 nm, 25 nm, 20 nm, 15 nm, 10 nm, 5 nm, 4 nm, 3 nm, 2 nm, 1 nm, a monolayer (e.g., 0.2 nm) or even less than a monolayer (e.g., 0.01 nm); in some embodiments, in a range from 0.01 nm to 50 nm, 1 nm to 50 nm, 5 nm to 40 nm, or even 5 nm to 35 nm).

In some embodiments, nanoporous oxygen reduction catalyst material described herein has at least two crystalline phases present, wherein one of the crystalline phases is richer in Ni than the other crystalline phase. In some embodiments, there is a difference in at least one lattice parameter between the crystalline phase richer in Ni than the other crystalline phase is at least 3.5% (in some embodiments, in a range from 3.3% to 3.6%).

Catalysts described herein are useful, for example, in fuel cell membrane electrode assemblies (MEAs). "Membrane electrode assembly" refers to a layered sandwich of fuel cell materials comprising a membrane, anode and cathode electrode layers, and gas diffusion layers. Typically, the cathode catalyst layer comprises a catalyst described herein, although in some embodiments, the anode catalyst layer independently comprises a catalyst described herein.

An MEA comprises, in order:

a first gas distribution layer having first and second opposed major surfaces;

an anode catalyst layer having first and second opposed major surfaces, the anode catalyst comprising a first catalyst;

an electrolyte membrane;

a cathode catalyst layer having first and second opposed major surfaces, the cathode catalyst comprising a second catalyst; and a second gas distribution layer having first and second opposed major surfaces.

Electrolyte membranes conduct reaction intermediate ions between the anode and cathode catalyst layers. Electrolyte membranes preferably have high durability in the electrochemical environment, including chemical and electrochemical oxidative stability. Electrolyte membranes preferably have low ionic resistance for the transport of the reaction intermediate ions, but are relatively impermeable barriers for other ions, electrons, and reactant species. In some embodiments, the electrolyte membrane is a proton exchange membrane (PEM), which conducts cations. In PEM fuel cells, the electrolyte membrane preferably conducts protons. PEMs are typically a partially fluorinated or perfluorinated polymer comprised of a structural backbone and pendant cation exchange groups. PEMs are available, for example, from E. I. du Pont de Nemours and Company, Wilmington, Del., under the trade designation "NAFION;" Solvay, Brussels, Belgium, under the trade designation "AQUIVION;" 3M Company, St. Paul, Minn., under the designation "3M PFSA MEMBRANE;" and Asahi Glass Co., Tokyo, Japan, under the trade designation "FLEMION."

A gas distribution layer generally delivers gas evenly to the electrodes and, in some embodiments, conducts electricity. It also provides for removal of water in either vapor or liquid form, in the case of a fuel cell. Gas distribution layers are typically porous to allow reactant and product transport between the electrodes and the flow field. Sources of gas distribution layers include carbon fibers randomly oriented to form porous layers, in the form of non-woven paper or woven fabrics. The non-woven carbon papers are available, for example, from Mitsubishi Rayon Co., Ltd., Tokyo, Japan, under the trade designation "GRAFIL U-105;" Toray Corp., Tokyo, Japan, under the trade designation "TORAY;" AvCarb Material Solutions, Lowell, Mass., under the trade designation "AVCARB;" SGL Group, the Carbon Company, Wiesbaden, Germany, under the trade designation "SIGRACET;" Freudenberg FCCT SE & Co. KG, Fuel Cell Component Technologies, Weinheim, Germany, under the trade designation "FREUDENBERG;" and Engineered Fibers Technology (EFT), Shelton, Conn., under the trade designation "SPECTRACARB GDL." The woven carbon fabrics or cloths are available, for example, from Electro Chem Inc., Woburn, Mass., under the trade designations "EC-CC1-060" and "EC-AC-CLOTH;" NuVant Systems Inc., Crown Point, Ind., under the trade designations "ELAT-LT" and "ELAT;" BASF Fuel Cell GmbH, North America, under the trade designation "E-TEK ELAT LT;" and Zoltek Corp., St. Louis, Mo., under the trade designation "ZOLTEK CARBON CLOTH." The non-woven paper or woven fabrics can be treated to modify its hydrophobicity (e.g., treatment with a polytetrafluoroethylene (PTFE) suspension with subsequent drying and annealing). Gas dispersion layers often comprise a porous layer of sub-micrometer electronically-conductive particles (e.g., carbon), and a binder (e.g., PTFE). Although not wanting to be bound by theory, it is believed that gas dispersion layers facilitate reactant and product water transport between the electrode and the gas distribution layers.

At least one of the anode or cathode catalyst has whiskers with nanoporous oxygen reduction catalyst material described herein. The "other catalyst layer" can be a conventional catalyst known in the art, and provided by techniques known in the art (e.g., U.S. Pat. No. 5,759,944 (Buchanan et al.), U.S. Pat. No. 5,068,161 (Keck et al.), and U.S. Pat. No. 4,447,506 (Luczak et al.)), the disclosures of which are incorporated herein by reference.

In some embodiments, the cathode and/or anode catalyst layer comprises whiskers with nanoporous oxygen reduction catalyst material described herein.

A fuel cell is an electrochemical device that combines hydrogen fuel and oxygen from the air to produce electricity, heat, and water. Fuel cells do not utilize combustion, and as such, fuel cells produce little, if any, hazardous effluents. Fuel cells convert hydrogen fuel and oxygen directly into electricity, and can be operated, for example, at much higher efficiencies than internal combustion electric generators.

Figure 2:
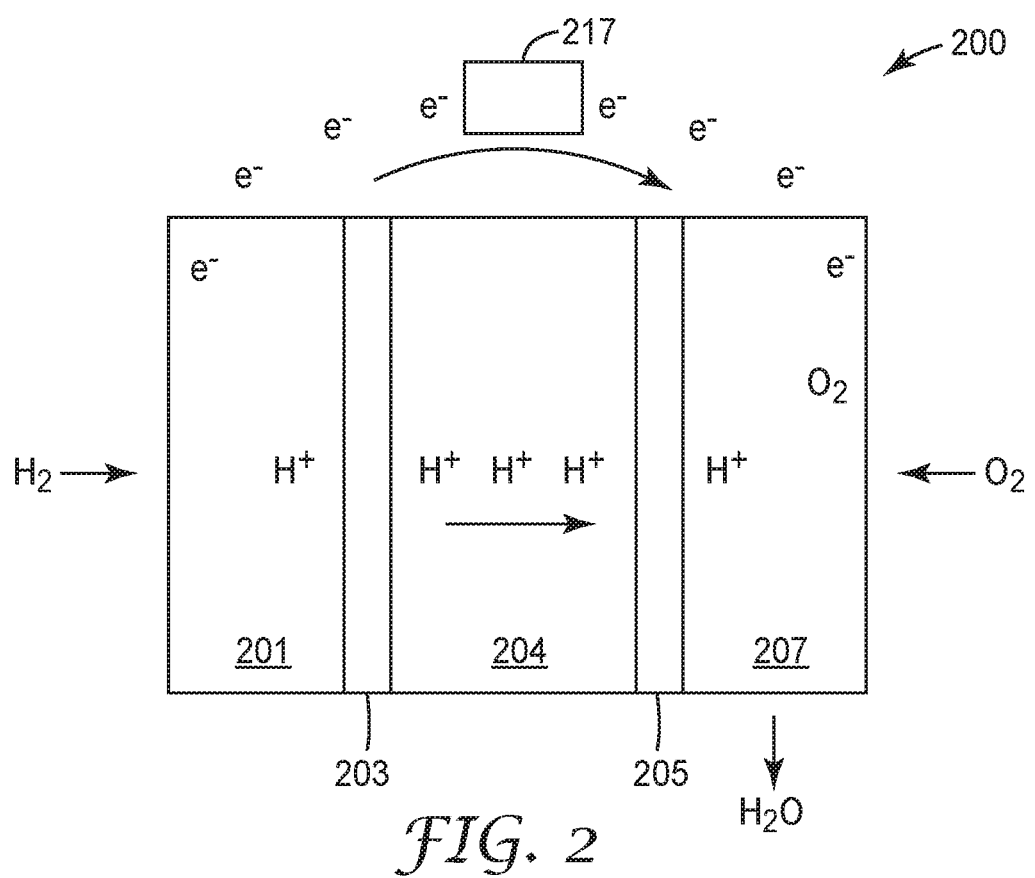
FIG. 2 is a schematic of an exemplary fuel cell.

Referring to FIG. 2, exemplary fuel cell 200 includes first gas distribution layer 201 adjacent to anode 203. Adjacent anode 203 is an electrolyte membrane 204. Cathode 205 is situated adjacent electrolyte membrane 204, and second gas distribution layer 207 is situated adjacent cathode 205. In operation, hydrogen fuel is introduced into the anode portion of the fuel cell 200, passing through first gas distribution layer 201 and over anode 203. At anode 203, the hydrogen fuel is separated into hydrogen ions ($H^+$) and electrons ($e^-$).

Electrolyte membrane 204 permits only the hydrogen ions or protons to pass through electrolyte membrane 204 to the cathode portion of fuel cell 200. The electrons cannot pass through electrolyte membrane 204 and, instead, flow through an external electrical circuit in the form of electric current. This current can power an electric load 217, such as an electric motor, or be directed to an energy storage device, such as a rechargeable battery.

Oxygen flows into the cathode side of fuel cell 200 via second distribution layer 207. As the oxygen passes over cathode 205, oxygen, protons, and electrons combine to produce water and heat.

EXEMPLARY EMBODIMENTS

1A. A nanoporous oxygen reduction catalyst material comprising PtNiIr.

2A. The nanoporous oxygen reduction catalyst material of Exemplary Embodiment 1A having pores with diameters in a range from 1 nm to 10 nm (in some embodiments, in a range from 2 nm to 8 nm, or even 3 nm to 7 nm).

3A. The nanoporous oxygen reduction catalyst material of any preceding A Exemplary Embodiment, wherein the PtNiIr material has the formula $Pt_xNi_yIr_z$, and wherein x is in a range from 26.6 to 47.8, y is in a range from 48.7 to 70, and z is in a range from 1 to 11.4 (in some embodiments, x is in a range from 26.6 to 47.6, y is in a range from 48.7 to 69.3, and z is in a range from 1 to 11.4; x is in a range from 26.6 to 30, y is in a range from 17 to 62, and z is in a range from 1 to 11.4; or even x is in a range from 47.6 to 47.8, y is in a range from 48.7 to 52.2, and z is in a range from 0 to 3.7; or even in one exemplary embodiment, x is 28.1, y is 64.9, and z is 7.0).

4A. The nanoporous oxygen reduction catalyst material of any preceding A Exemplary Embodiment, in the form of at least one nanoporous layer comprising platinum and nickel.

5A. The nanoporous oxygen reduction catalyst of Exemplary Embodiment 4A, wherein the nanoporous layers comprising platinum and nickel have a planar equivalent thicknesses up to 600 nm (in some embodiments, up to 575 nm, 550 nm, 500 nm, 400 nm, 300 nm, 200 nm, 100 nm, 75 nm, 50 nm, 25 nm, 10 nm, 5 nm, 2.5 nm, 1 nm, or even up to two monolayers (e.g., 0.4 nm); in some embodiments, in a range from 0.4 nm to 600 nm, 0.4 nm to 500 nm, 1 nm to 500 nm, 5 nm to 500 nm, 10 nm to 500 nm, 10 nm to 400 nm, or even 40 nm to 300 nm).

6A. The nanoporous oxygen reduction catalyst material of any of Exemplary Embodiments 4A or 5A, wherein a there is a layer comprising iridium on at least one of the nanoporous layers comprising platinum and nickel.

7A. The nanoporous oxygen reduction catalyst material of Exemplary Embodiment 6A, wherein the layer comprising iridium has a planar equivalent thickness up to 50 nm (in some embodiments, up to 45 nm, 40 nm, 35 nm, 30 nm, 25 nm, 20 nm, 15 nm, 10 nm, 5 nm, 4 nm, 3 nm, 2 nm, 1 nm, a monolayer (e.g., 0.2 nm) or even less than a monolayer (e.g., 0.01 nm); in some embodiments, in a range from 0.01 nm to 50 nm, 1 nm to 50 nm, 5 nm to 40 nm, or even 5 nm to 35 nm).

8A. The nanoporous oxygen reduction catalyst material of any preceding A Exemplary Embodiment having an exposed iridium surface layer.

9A. The nanoporous oxygen reduction catalyst material of any preceding A Exemplary Embodiment, wherein there are at least two crystalline phases present, wherein one of the crystalline phases is richer in Ni than the other crystalline phase. In some embodiments, there is a difference in at least one lattice parameter between the crystalline phase richer in Ni than the other crystalline phase by at least 3.5% (in some embodiments, in a range from 3.3% to 3.6%).

10A. The nanoporous oxygen reduction catalyst material of any preceding A Exemplary Embodiment, wherein the weight ratio of platinum to iridium is in a range from 1:1 to 50:1 (in some embodiments, in a range from 2:1 to 40:1).

11A. A catalyst comprising nanostructured elements comprising microstructured support whiskers having an outer surface at least partially covered by the nanoporous oxygen reduction catalyst material of any preceding A Exemplary Embodiment.

12A. A fuel cell membrane electrode assembly comprising the catalyst of Exemplary Embodiment 11A.

1B. A method comprising:
providing an oxygen reduction catalyst material comprising PtNiIr, wherein there are layers comprising platinum and nickel; and
dealloying at least some layers comprising platinum and nickel to remove nickel from at least one layer to provide the nanoporous oxygen reduction catalyst material of any of Exemplary Embodiments 1A to 10A. In some embodiments, there are pores with diameters in a range from 1 nm to 10 nm (in some embodiments, in a range from 2 nm to 8 nm, or even 3 nm to 7 nm) where the nickel was removed.

2B. The method of Exemplary Embodiment 1B, further comprising annealing the catalyst before dealloying.

3B. The method of any preceding B Exemplary Embodiment, further comprising depositing platinum and nickel from a target comprising platinum and nickel and depositing iridium from a target comprising iridium.

4B. The method of Exemplary Embodiment 3B, wherein the target is a $Pt_3Ni_7$ target.

5B. A method of making the catalyst of either Exemplary Embodiment 1B or 2B, further comprising depositing platinum from a target comprising platinum, depositing nickel from a target comprising nickel, and depositing iridium from a target comprising iridium.

6B. The method of any preceding B Exemplary Embodiment, wherein layers of the oxygen reduction catalyst material, before dealloying, comprising platinum and nickel having a planar equivalent thickness in a range from 0.4 nm to 580 nm (in some embodiments, in a range from 0.4 nm to 72 nm) and layers comprising iridium have a planar equivalent thickness in a range from 0.01 nm to 32 nm (in some embodiments, in a range from 0.01 nm to 16 nm, or even a range from 0.01 nm to 2 nm).

7B. The method of any preceding B Exemplary Embodiment, wherein the weight ratio of platinum to iridium is in a range from 2.4:1 to 34.3:1 (in some embodiments, in a range from 6.5:1 to 34.3:1, or even 9.7:1 to 34.3:1).

1C. A method of making the catalyst of any of Exemplary Embodiment 1A to 10A, the method comprising:
depositing platinum and nickel from a target comprising platinum and nickel to provide a first layer comprising platinum and nickel;
depositing a layer comprising iridium from a target comprising iridium;
repeating the preceding two steps, in order, at least once (in some embodiments, repeating 2, 3, 4, 5, 10, 15, 20, 25, 50, 75, 100, 150, 200, 250, or even at least 275 times); and
dealloying at least one layer comprising platinum and nickel to remove nickel from the layer. In some embodiments, there are pores with diameters in a range from 1 nm to 10 nm (in some embodiments, in a range from 2 nm to 8 nm, or even 3 nm to 7 nm) where the nickel was removed.

2C. The method of Exemplary Embodiment 1C, wherein the target is a $Pt_3Ni_7$ target.

3C. The method of any preceding C Exemplary Embodiment, further comprising annealing the layers before dealloying.

4C. The method of any preceding C Exemplary Embodiment, wherein layers comprising platinum and nickel have a planar equivalent thickness in a range from 0.4 nm to 70 nm (in some embodiments, in a range from 0.4 nm to 10 nm, 0.4 nm to 5 nm, 1 nm to 25 nm, or even 1 nm to 10 nm) and layers comprising iridium have a planar equivalent thickness in a range from 0.01 nm to 20 nm (in some embodiments, in a range from 0.01 nm to 10 nm, 0.01 nm to 5 nm, 0.02 nm to 2.5 nm, or even 0.02 nm to 1 nm).

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Examples 1-4

Nanostructured whiskers employed as catalyst supports were made according to the process described in U.S. Pat. No. 5,338,430 (Parsonage et al.), U.S. Pat. No. 4,812,352 (Debe), and U.S. Pat. No. 5,039,561 (Debe), incorporated herein by reference, using as substrates the microstructured catalyst transfer substrates (or MCTS) described in U.S. Pat. No. 6,136,412, also incorporated herein by reference. Perylene red pigment (i.e., N,N'-di(3,5-xylyl)perylene-3,4:9,10-bis(dicarboximide)) (C.I. Pigment Red 149, also known as "PR149", obtained from Clariant, Charlotte, N.C.) was sublimation vacuum coated onto MCTS with a nominal thickness of 200 nm, after which it was annealed. After deposition and annealing, highly oriented crystal structures were formed with large aspect ratios, controllable lengths of about 0.5 to 2 micrometers, widths of about 0.03-0.05 micrometer and areal number density of about 30 whiskers per square micrometer, oriented substantially normal to the underlying substrate.

Nanostructured thin film (NSTF) catalyst layers were prepared by sputter coating catalyst films sequentially using a DC-magnetron sputtering process onto the layer of nanostructured whiskers. A vacuum sputter deposition system (obtained as Model Custom Research from Mill Lane Engineering Co., Lowell, Mass.) equipped with 4 cryo-pumps (obtained from Austin Scientific, Oxford Instruments, Austin, Tex.), a turbopump and using typical Ar sputter gas pressures of about 5 mTorr (0.66 Pa), and 2 inch×10 inch (5 cm×25.4 cm) rectangular sputter targets (obtained from Sophisticated Alloys, Inc., Butler, Pa.) was used. The coatings were deposited by using ultra high purity Ar as the sputtering gas. Pt and Ni were first simultaneously deposited from a single alloy $Pt_3Ni_7$ target (30 at. % Pt and 70 at. % Ni, obtained from Sophisticated Alloys, Butler, Pa.). 50 layers of $Pt_3Ni_7$ were deposited, each with about 2.8 nm planar equivalent thickness, resulting in an areal Pt loading of about 0.10 $mg_{Pt}/cm^2$. $Pt_3Ni_7$ catalysts deposited from a single alloy target are referred to as "single target" (ST). Ir (obtained from Materion, Mayfield Heights, Ohio) was then subsequently deposited onto the surface of four pieces of the $Pt_3Ni_7$-coated NSTF catalyst on substrate, each with a different Ir areal loading calculated to yield 1, 2, 5, and 10 at. % Ir content in the electrocatalyst (Examples 1, 2, 3, and 4, respectively). The Ir layer planar equivalent thickness for Examples 1, 2, 3, and 4 was 1.5 nm, 2.9 nm, 7.1 nm, and 12.7 nm, respectively.

Representative areas of the electrocatalysts were analyzed for bulk composition using X-Ray Fluorescence spectroscopy (XRF). Representative catalyst samples were evaluated on MCTS using a wavelength dispersive X-ray fluorescence spectrometer (obtained under the trade designation "PRIMUS II" from Rigaku Corporation, Tokyo, Japan) equipped with a rhodium (Rh) X-ray source, a vacuum atmosphere, and a 20-mm diameter measurement area. Each sample was analyzed three times to obtain the average and standard deviation for the measured Pt, Ni, and Ir signal intensities, which are proportional to loading. The areal loading for the electrocatalysts Pt, Ni, and Ir of Examples 1-4 were determined by comparing their measured XRF intensities to the XRF intensities obtained with standard NSTF electrocatalysts containing Pt, Ni, and Ir with known areal loadings. From the XRF-determined Pt, Ni, and Ir areal loadings, the catalysts' composition and Pt-to-Ir weight ratios were calculated. The total platinum group metal (PGM) content was determined by adding the Pt and Ir areal loadings. Loading and composition information is provided in Table 1, below.

After assembly, the test cells were connected to a test station (obtained under the trade designation "SINGLE FUEL CELL TEST STATION" from Fuel Cell Technologies, Inc.). The MEA was then operated for about 40 hours under a conditioning protocol to achieve apparent steady state performance. The protocol consisted of repeated cycles of operational and shutdown phases, each about 40 and 45 minutes in duration, respectively. In the operational phase, the MEA was operated at 75° C. cell temperature, 70° C. dew point, 101/101 kPaA $H_2$/Air, with constant flow rates of 800 and 1800 sccm of $H_2$ and air, respectively. During the 40-minute operational phase, the cell voltage was alternated between 5-minute long polarization cycles between 0.85 V and 0.25 V and 5-minute long potential holds at 0.40 V. During the 45-minute shutdown phase, the cell potential was set to open circuit voltage, $H_2$ and air flows to the cell were halted, and the cell temperature was cooled towards room temperature while liquid water was injected into the anode and cathode cell inlets at 0.26 g/min. and 0.40 g/min., respectively. Without being bound by theory, it is believed the fuel cell conditioning protocol, which includes numerous potential cycles, may induce formation of nanopores within the electrocatalyst.

TABLE 1

| Example | PtNi Deposition | Ir Incorporation | Loading, mg/cm² | | | | Composition, at. % | | | Pt:Ir Weight Ratio |
|---|---|---|---|---|---|---|---|---|---|---|
| | | | Pt | Ni | Ir | PGM | Pt | Ni | Ir | |
| Comp. Ex. A | ST | None | 0.104 | 0.073 | 0.000 | 0.104 | 30.0 | 70.0 | 0.0 | Infinite |
| Ex. 1 | ST | Top layer | 0.103 | 0.072 | 0.003 | 0.106 | 29.7 | 69.3 | 1.0 | 31.1 |
| Ex. 2 | ST | Top layer | 0.103 | 0.072 | 0.007 | 0.109 | 29.4 | 68.7 | 1.9 | 15.7 |
| Ex. 3 | ST | Top layer | 0.104 | 0.073 | 0.016 | 0.120 | 28.7 | 66.9 | 4.4 | 6.6 |
| Ex. 4 | ST | Top layer | 0.102 | 0.072 | 0.029 | 0.131 | 27.6 | 64.5 | 7.9 | 3.6 |
| Ex. 5 | ST | Bilayer | 0.102 | 0.072 | 0.003 | 0.105 | 29.7 | 69.3 | 1.0 | 31.7 |
| Ex. 6 | ST | Bilayer | 0.101 | 0.071 | 0.007 | 0.108 | 29.4 | 68.6 | 2.1 | 14.5 |
| Ex. 7 | ST | Bilayer | 0.107 | 0.075 | 0.011 | 0.118 | 29.1 | 67.9 | 3.0 | 9.8 |
| Ex. 8 | ST | Bilayer | 0.100 | 0.070 | 0.042 | 0.142 | 26.6 | 62.0 | 11.4 | 2.4 |

The $Pt_xNi_yIr_z$ catalysts and NSTF PtCoMn coated anode catalyst whiskers (0.05 $mg_{Pt}$/cm², $Pt_{69}Co_{28}Mn_3$) on MCTS were then transferred to either side of a 24-micrometer thick proton exchange membrane (available under the trade designation "3M PFSA 825EW" (neat) from 3M Company, St. Paul, Minn.), using a laminator (obtained under the trade designation "HL-101" from ChemInstruments, Inc., West Chester Township, Ohio) to form a catalyst coated membrane (CCM). The three-layer stack-up was hand fed into the laminator with hot nip rolls at 270° F. (132° C.), 150 psi (1.03 MPa) nip, and rotating at the equivalent of 0.5 fpm (0.25 cm/s). Immediately after lamination, the MCTS layers were peeled back, leaving the catalyst coated whiskers embedded into either side of the PEM. The CCM was installed with identical gas diffusion layers (available under the trade designation "3M 2979 GAS DIFFUSION LAYERS" from 3M Company) on the anode and cathode in 50 cm² active area test cells (obtained under the trade designation "50 CM2 CELL HARDWARE" from Fuel Cell Technologies, Inc., Albuquerque, N. Mex.) with quad-serpentine flow fields with gaskets selected to give 10% compression of the gas diffusion layers. The catalyst of the present invention was evaluated as the fuel cell cathode.

After conditioning the MEA, the electrocatalysts were characterized for relevant beginning of life (BOL) characteristics, including catalyst activity, surface area, and operational performance under relevant $H_2$/Air test conditions, described as follows.

Figure 3A:
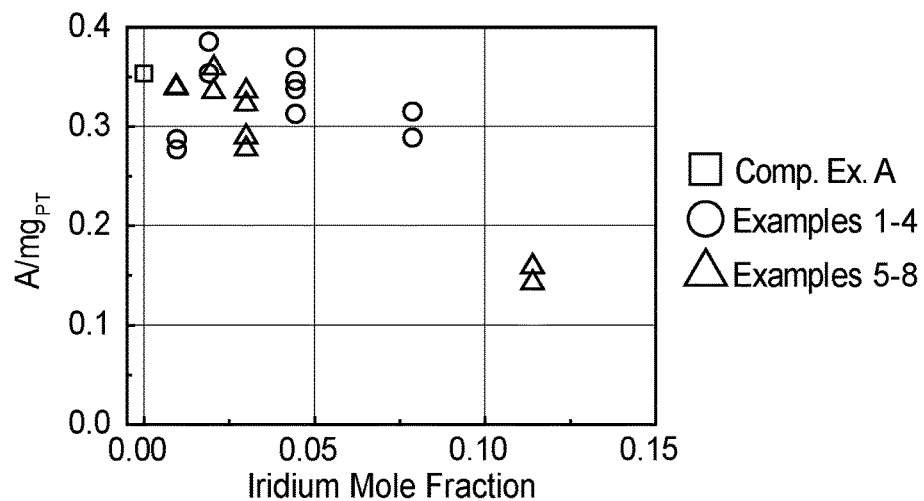
FIG. 3A is a plot of the electrocatalyst mass activity of Examples 1-8 and Comparative Example A catalysts, normalized to platinum content.
Figure 3B:
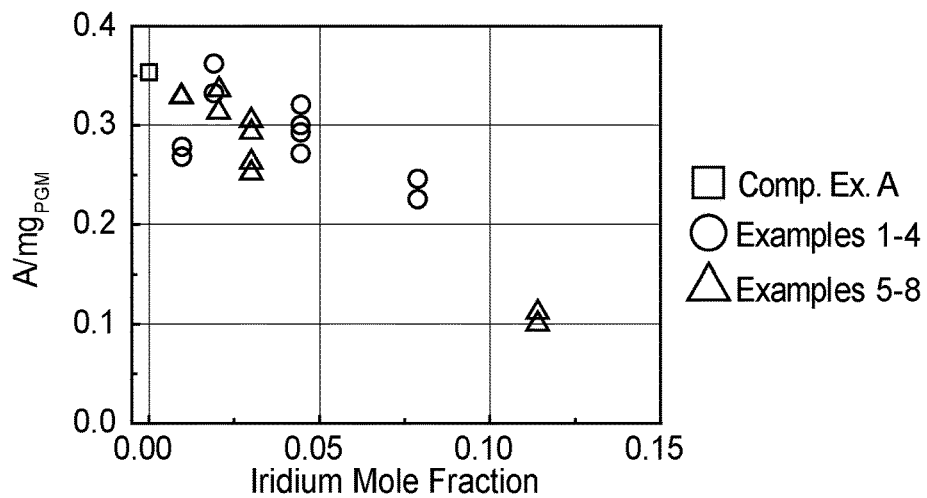
FIG. 3B is a plot of the electrocatalyst activity of Examples 1-8 and Comparative Example A catalysts, normalized to total platinum group metal content.

The cathode oxygen reduction reaction (ORR) absolute activity was measured with saturated 150 kPaA $H_2/O_2$, 80° C. cell temperature for 1200 seconds at 900 mV vs. the 100% $H_2$ reference/counter electrode. The ORR absolute activity (A/cm² or mA/cm²) was obtained by adding the measured current density after 1050 seconds of hold time and the electronic shorting and hydrogen crossover current densities, estimated from 2 mV/s cyclic voltammograms measured with $N_2$ fed to the working electrode instead of $O_2$. The electrocatalyst mass activity, a measure of the catalyst activity per unit precious metal content, is calculated by dividing the corrected ORR absolute activity (A/cm²$_{planar}$) by the cathode Pt or PGM areal loading (mg/cm²) to obtain the mass activity (A/mg$_{Pt}$ or A/mg$_{PGM}$). The electrocatalyst mass activity is provided in Table 2, below, and FIGS. 3A and 3B.

TABLE 2

| Example | Ir Incorporation | Ir Content at. % | Specific Area m²/g$_{Pt}$ | Specific Area m²/g$_{PGM}$ | Mass Activity A/mg$_{Pt}$ | Mass Activity A/mg$_{PGM}$ | H₂/Air Performance Volts |
|---|---|---|---|---|---|---|---|
| Comp. Ex. A | none | 0 | 16.1 | 16.1 | 0.35 | 0.35 | 0.892 |
| Ex. 1 | Top layer | 1.0 | 16.1 | 15.6 | 0.34 | 0.33 | 0.895 |
| Ex. 2 | Top layer | 2.0 | 17.4 | 16.2 | 0.35 | 0.32 | 0.896 |
| Ex. 3 | Top layer | 3.0 | 18.8 | 17.1 | 0.31 | 0.28 | 0.897 |
| Ex. 4 | Top layer | 11.4 | 19.0 | 13.3 | 0.15 | 0.11 | 0.879 |
| Ex. 5 | Bilayer | 1.0 | 15.5 | 15.1 | 0.28 | 0.27 | 0.898 |
| Ex. 6 | Bilayer | 1.9 | 17.0 | 16.0 | 0.37 | 0.35 | 0.896 |
| Ex. 7 | Bilayer | 4.4 | 19.2 | 16.6 | 0.34 | 0.30 | 0.896 |
| Ex. 8 | Bilayer | 7.9 | 20.7 | 16.2 | 0.30 | 0.24 | 0.896 |

Figure 3C:
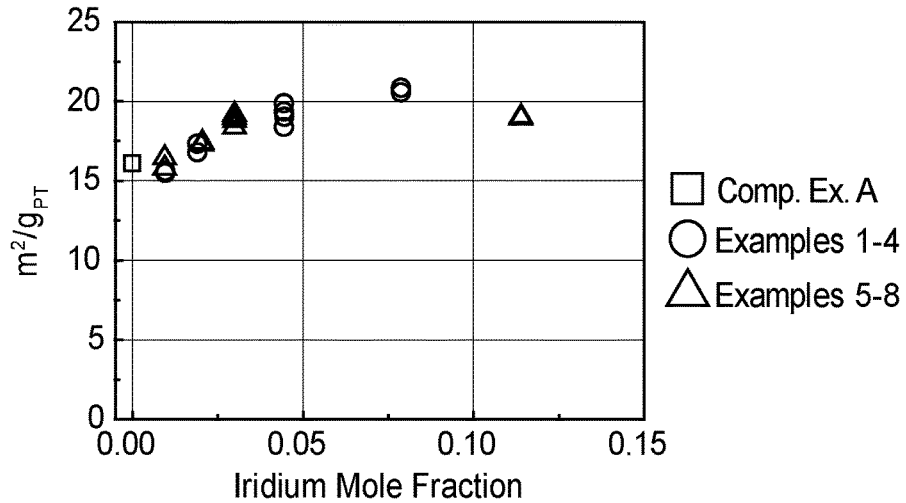
FIG. 3C is a plot of the electrocatalyst surface area of Examples 1-8 and Comparative Example A catalysts, normalized to platinum content.
Figure 3D:
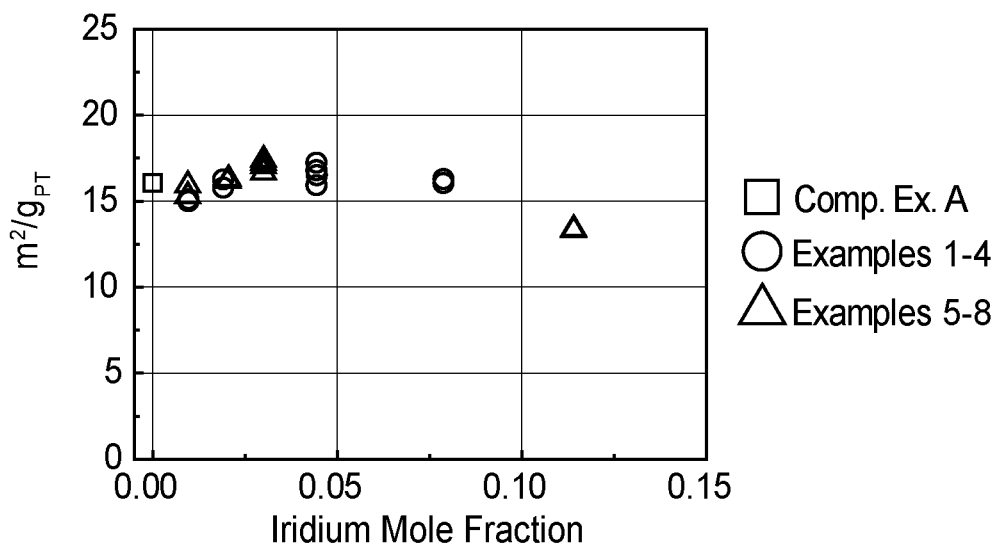
FIG. 3D is a plot of the electrocatalyst surface area of Examples 1-8 and Comparative Example A catalysts, normalized to total platinum group metal content.

The cathode catalyst surface enhancement factor (SEF, $m^2_{Pt}/m^2_{planar}$ or analogously $cm^2_{Pt}/cm^2_{planar}$) was measured via cyclic voltammetry (100 mV/s, 0.65 V-0.85 V, average of 100 scans) under saturated 101 kilopascals absolute pressure (kPaA) H₂/N₂ and 70° C. cell temperature. The SEF was estimated by taking the average of the integrated hydrogen underpotential deposition (H$_{UPD}$) charge (C/cm²$_{planar}$) for the oxidative and reductive waves and dividing by 220 μC/cm²Pt. The electrocatalyst's specific surface area ($m^2_{Pt}/g_{Pt}$ or $m^2_{Pt}/g_{PGM}$), a measure of catalyst dispersion, was calculated by dividing the SEF ($m^2_{Pt}/m^2_{planar}$) by the areal Pt or total platinum group metal (PGM) loading ($g_{Pt}/m^2_{planar}$ or $g_{PGM}/m^2_{planar}$). The electrocatalyst specific area is provided in Table 2, above, and FIGS. 3C and 3D.

Figure 3E:
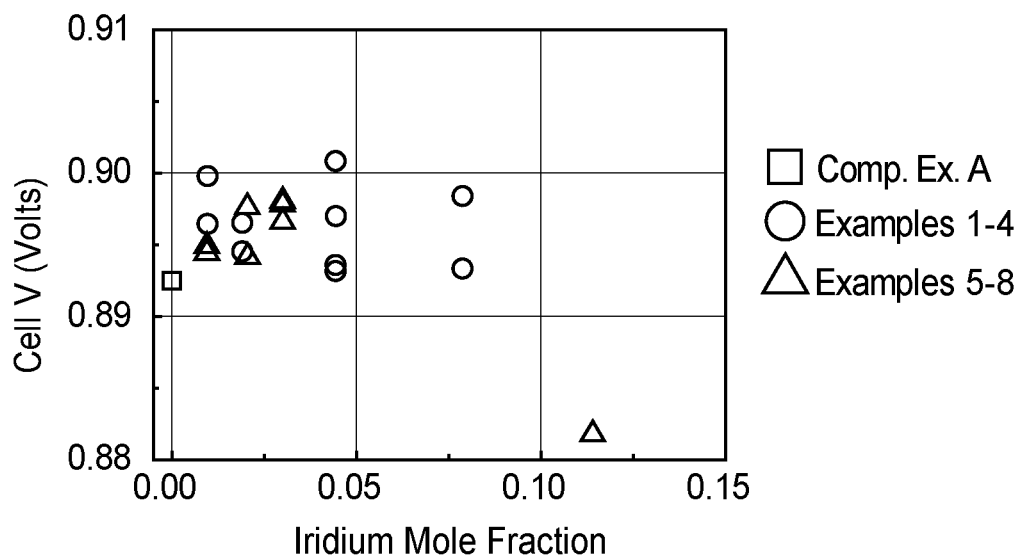
FIG. 3E is a plot of fuel cell performance of Examples 1-8 and Comparative Example A catalysts.

The operational performance of electrocatalysts was evaluated via H₂/Air polarization curves, measured at 80° C. cell temperature, 68° C. dew point, 150/150 kPaA H₂/Air, with constant stoichiometry of 2.0 H₂ and 2.5 for air. The current density was initially set to 20 mA/cm², and then stepwise increased while the cell voltage was maintained above 0.40 V, after which the current density was stepwise decreased back to 20 mA/cm². The cell was held at each current density for 2 minutes. The cell voltage at a specific current density, 20 mA/cm², is reported as "H₂/Air Performance" and is reported in Table 2, above, and FIG. 3E.

Figure 4B:
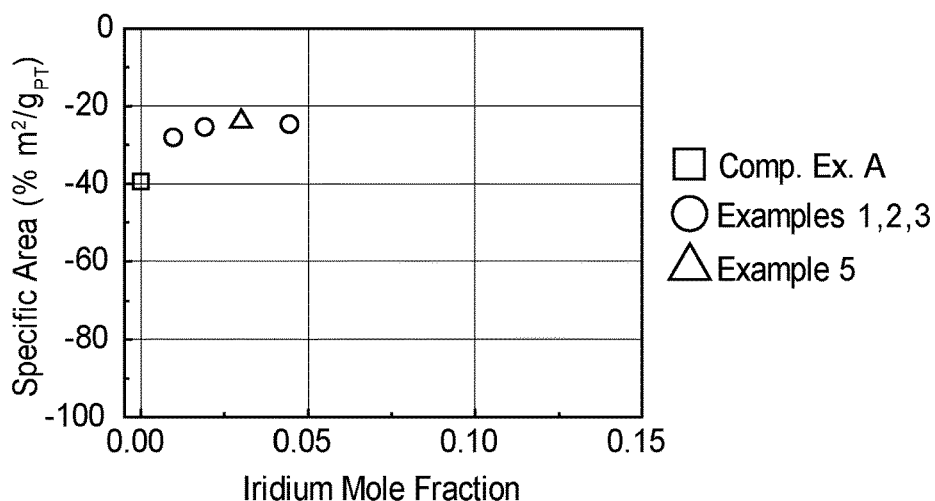
FIG. 4B is a plot of the change in electrocatalyst surface area after a durability test, normalized to platinum content, for Examples 1-8 and Comparative Example A.
Figure 4C:
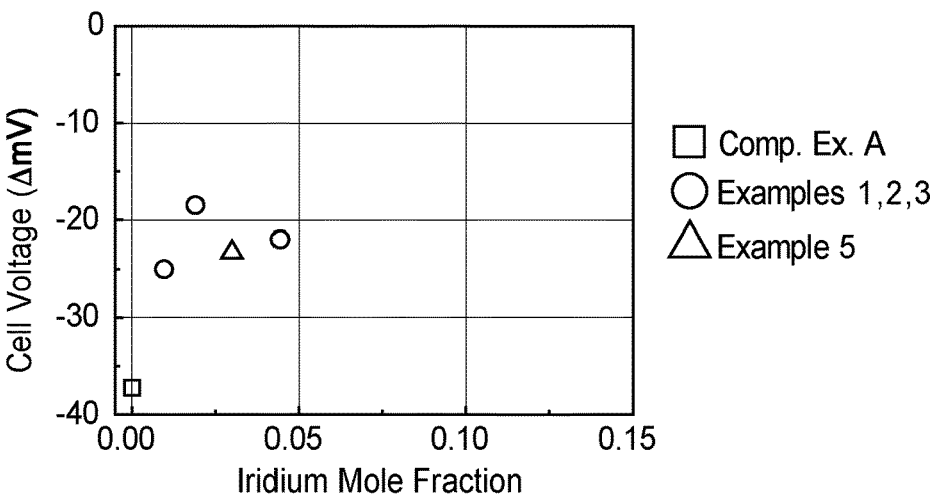
FIG. 4C is a plot of the change in fuel cell performance after a durability test for Examples 1-8 and Comparative Example A.

Example 1, 2, and 3 catalysts were additionally evaluated under an accelerated stress test (AST), which evaluated the stability of the electrocatalyst metal. In this test, the cell was operated at 80° C. cell temperature, 200/200 sccm H₂/N₂, 101 kPaA, 100% inlet relative humidity (RH), and the cathode electrode potential was cycled between 0.6 V-1.0 V vs. the hydrogen counter/reference electrode at a scan rate of 50 mV/s. Without being bound by theory, it is believed the AST protocol, which includes numerous potential cycles, may induce formation of nanopores within the electrocatalyst. After 10 or 15 thousand AST cycles, the MEA was reconditioned for about 16 hours using the initial conditioning protocol, after which the cathode surface area, ORR activity, and H₂/Air polarization curves were again measured to determine the rate and extent of performance loss. This process of AST, reconditioning, and characterization was repeated such that the cell was exposed to a total of 30,000 AST cycles. The changes in specific area, mass activity, and H₂/Air performance after the 30,000 AST cycles are listed in Table 3, below, and shown in FIGS. 4A, 4B, and 4C.

TABLE 3

| Example | # of Samples Evaluated | Ir Incorporation | Ir Content at. % | Specific Area Change % m²/g$_{Pt}$ | Pt Mass Activity Change % A/mg$_{Pt}$ | H₂/Air Performance Change Volts |
|---|---|---|---|---|---|---|
| Comp. Ex. A | 1 | none | 0.0 | −39.5 | −61.6 | −0.037 |
| Ex. 1 | 2 | Top layer | 1.0 | −28.1 | −40.3 | −0.025 |
| Ex. 2 | 2 | Top layer | 1.9 | −25.4 | −35.1 | −0.018 |
| Ex. 3 | 1 | Top layer | 4.4 | −24.7 | −40.3 | −0.022 |
| Ex. 7 | 1 | Bilayer | 3.0 | −24.0 | −37.5 | −0.023 |

Examples 5-8

Examples 5-8 were prepared and evaluated as described for Examples 1-4, except that the Ir metal was incorporated into the alloy during deposition of the Pt₃Ni₇, and only Example 7 was evaluated for durability with the AST protocol.

Four electrocatalysts were generated with varying Ir content. For each, a first "ST" Pt₃Ni₇ layer was deposited with about 1 nm planar equivalent thickness, onto which an Ir layer was deposited. The Ir planar equivalent thicknesses were about 0.01 nm, 0.02 nm, 0.04 nm, and 0.14 nm for Examples 5, 6, 7, and 8, respectively. This deposition process was repeated 135 times until an areal Pt loading of about 0.10 mg$_{Pt}$/cm² was achieved.

Loading and composition information is provided in Table 1, above. The catalyst mass activity, specific area, and H₂/Air performance after initial conditioning are reported in Table 2, above, and shown in FIGS. 3A, 3B, 3C, 3D, and 3E. The changes in specific area, mass activity, and H₂/Air performance of Example 7 after the 30,000 AST cycles tested are listed in Table 3, above, and shown in FIGS. 4A, 4B, and 4C.

Comparative Example A

Comparative Example A was prepared and evaluated as described for Example 1, except that no Ir was incorporated into the catalyst.

Loading and composition information is provided in Table 1, above. The catalyst specific area, mass activity, and H$_2$/Air performance after initial conditioning are reported in Table 2, above, and shown in FIGS. 3A, 3B, 3C, 3D, and 3E. The changes in specific area, mass activity, and H$_2$/Air performance after the 30,000 AST cycles tested are listed in Table 3, above, and shown in FIGS. 4A, and 4C.

Comparative Example B

Comparative Example B was prepared as generally described for Comparative Example A, except that during electrocatalyst deposition the Pt$_3$Ni$_7$ loading and layer planar equivalent thickness differed. Three layers of Pt$_3$Ni$_7$ were deposited, each with about 57 nm planar equivalent thickness, resulting in a Pt areal loading of about 0.13 mg$_{Pt}$/cm$^2$. Loading and composition information is provided in Table 4, below.

Figure 5A:
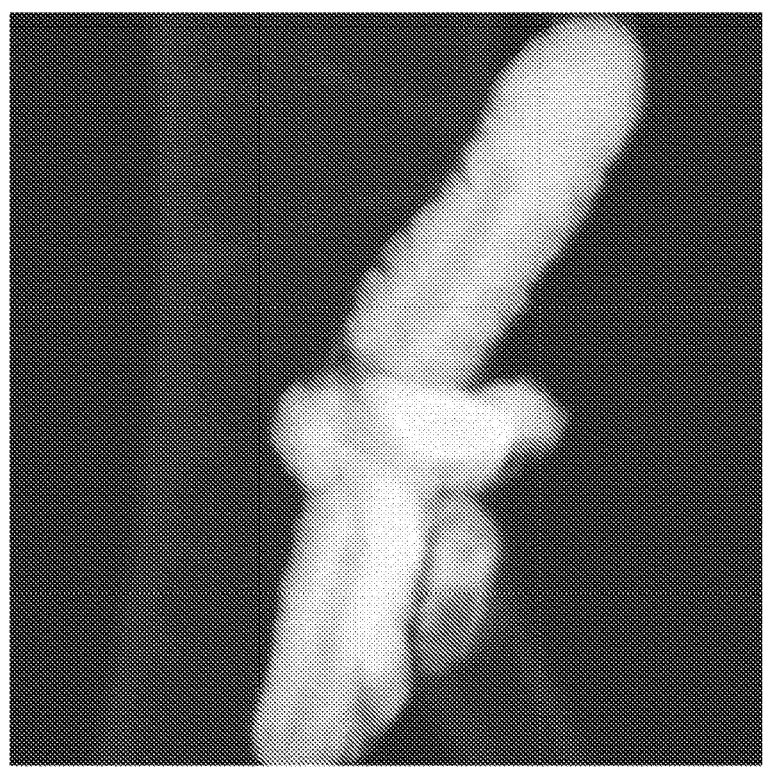
FIG. 5A is a transmission electron micrograph (TEM) of Comparative Example B at 225,000×.
Figure 5B:
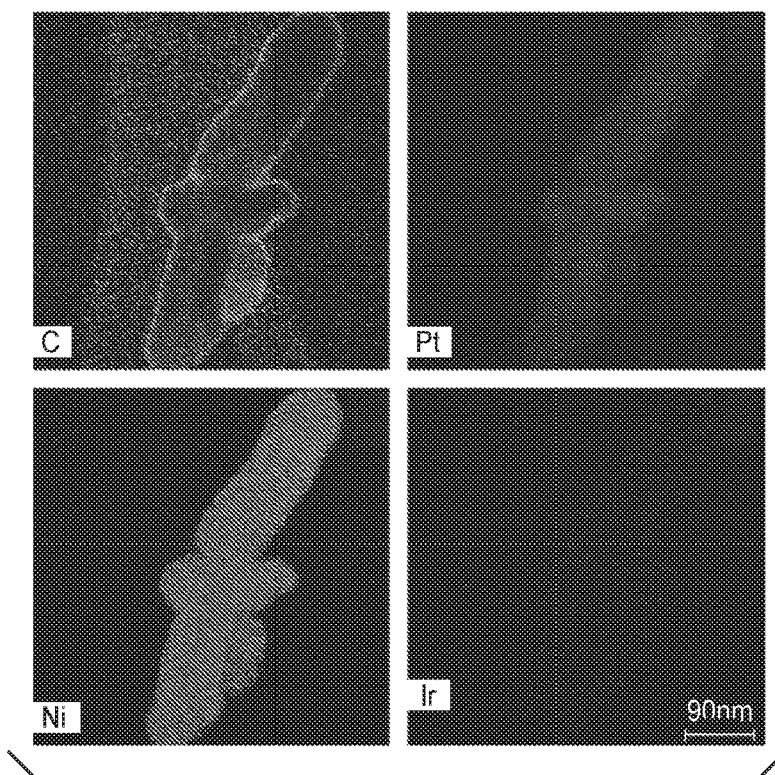
FIG. 5B is a set of energy dispersive spectroscopy (EDS) elemental composition maps of Comparative Example B.
Figure 8A:
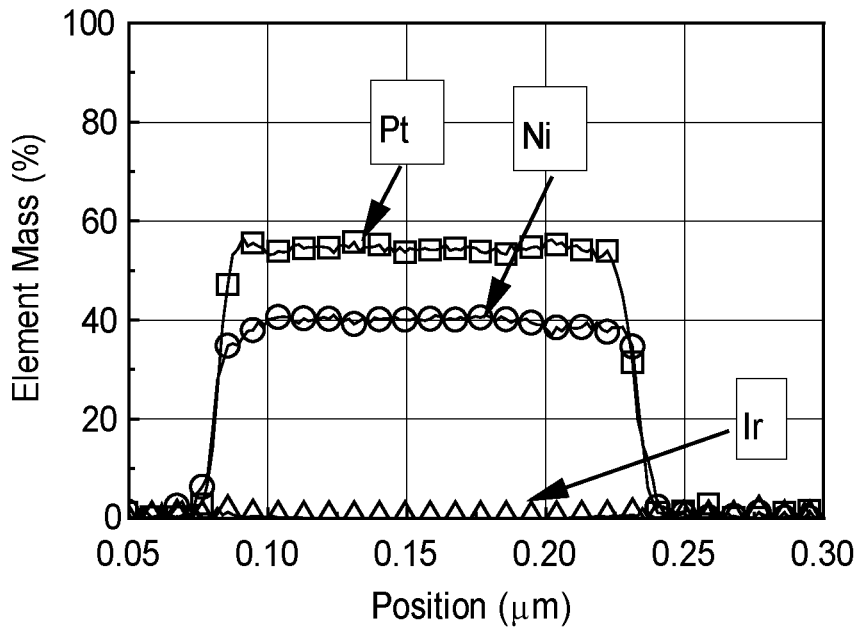
FIG. 8A is a linear composition profile of Comparative Example B, taken through the entire thickness of a catalyzed whisker, expressed as element mass percent.
Figure 8B:
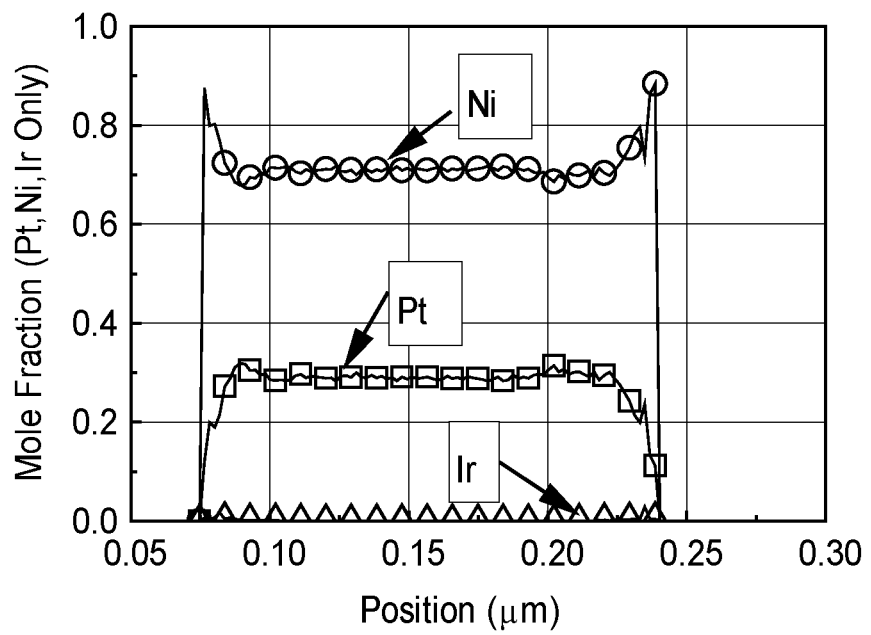
FIG. 8B is a linear composition profile of Comparative Example B, taken through the entire thickness of a catalyzed whisker, expressed as element mole fraction.

A representative section of catalyst was evaluated for nanometer-scale structure and composition using transmission electron microscopy (TEM) (obtained under the trade designation "OSIRIS" from FEI, Hillsboro, Oreg.) and energy dispersive spectroscopy (EDS) (obtained under the trade designation "QUAD X-RAY DETECTOR" from Bruker, Billerica, Mass.), and with associated software (obtained under the trade designation "ESPRIT 1.9" from Bruker). For TEM and EDS analysis, the whiskers were scraped from the MCTS with a freshly broken bamboo splint to detach some whiskers and transfer them to a TEM grid coated with a thin carbon film. The samples were imaged in the TEM at 200 kV accelerating voltage. At least two different sample grid areas were viewed. The raw elemental maps were quantified to account for beam-spreading, absorption and fluorescence to produce quantitative weight percentage based elemental maps. A dark field TEM image of Comparative Example B is shown in FIG. 5A. A set of EDS element maps for C, Pt, Ni, and Ir, taken of the same area as shown in FIG. 5A, showing the spatial distribution of elements is shown in FIG. 5B. A linear composition profile of Comparative Example B, taken through the entire thickness of a catalyzed whisker detected by EDS, is plotted as element weight percentage in FIG. 8A. A linear composition profile through the entire thickness of a catalyzed whisker, calculated as Pt, Ni, and Ir mole fractions from the Pt, Ni, and Ir weight percentage data shown in FIG. 8A, is shown in FIG. 8B.

TABLE 4

| Example | PtNi Deposition | Process | Loading, mg/cm$^2$ | | | | Composition, at. % | | | Pt:Ir Weight Ratio |
|---|---|---|---|---|---|---|---|---|---|---|
| | | | Pt | Ni | Ir | PGM | Pt | Ni | Ir | |
| Comp. Ex. B | ST | none | 0.131 | 0.097 | 0.000 | 0.131 | 28.9 | 71.1 | 0.0 | Infinite |
| Comp. Ex. C | ST | Dealloyed | 0.134 | 0.044 | 0 | 0.134 | 47.8 | 52.2 | 0.0 | Infinite |
| Ex. 9 | ST | Dealloyed, Ir top layer | 0.133 | 0.041 | 0.010 | 0.143 | 47.6 | 48.7 | 3.7 | 13.3 |

Comparative Example B was analyzed as described for Comparative Example A, but additional composition and structural analysis was also performed.

Figure 9:
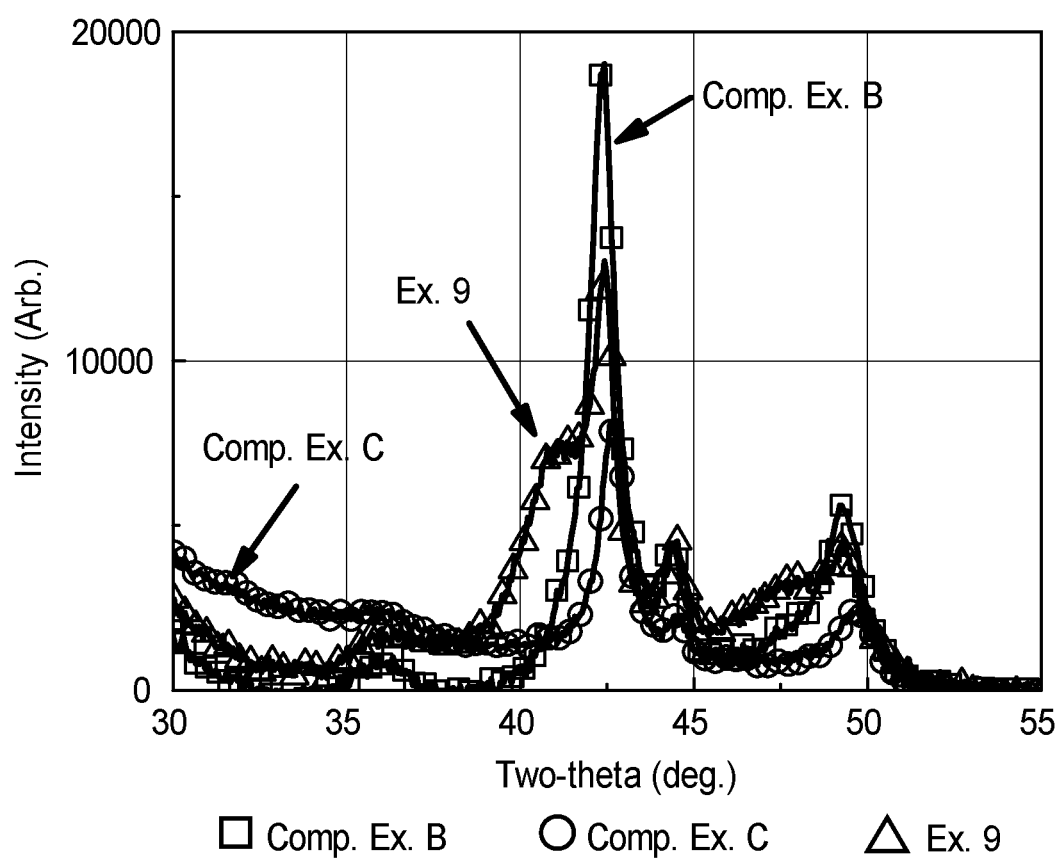
FIG. 9 is x-ray diffraction spectra of Comparative Examples B and C and Example 9.

Two representative sections of catalyst were analyzed for bulk crystalline structure using x-ray diffraction (XRD). Electrocatalysts on MCTS were analyzed via reflection geometry and data were collected in the form of a survey scan by use of a vertical diffractometer (PANalytical, Almelo, The Netherlands), copper K, radiation, and PIXcel detector registry of the scattered radiation. The diffractometer was fitted with variable incident beam slits and fixed diffracted beam slits. The survey scan was conducted from 30 to 55 degrees (2θ) using a 0.05-degree step size and 5500-second dwell time setting. X-ray generator settings of 40 kV and 40 mA were employed. A representative XRD spectra for Comparative Example B is shown in FIG. 9. Table 5, below, provides (111) grain sizes and lattice constants for the phase(s) detected from the XRD spectra taken from two representative catalyst sections.

Figure 10A:
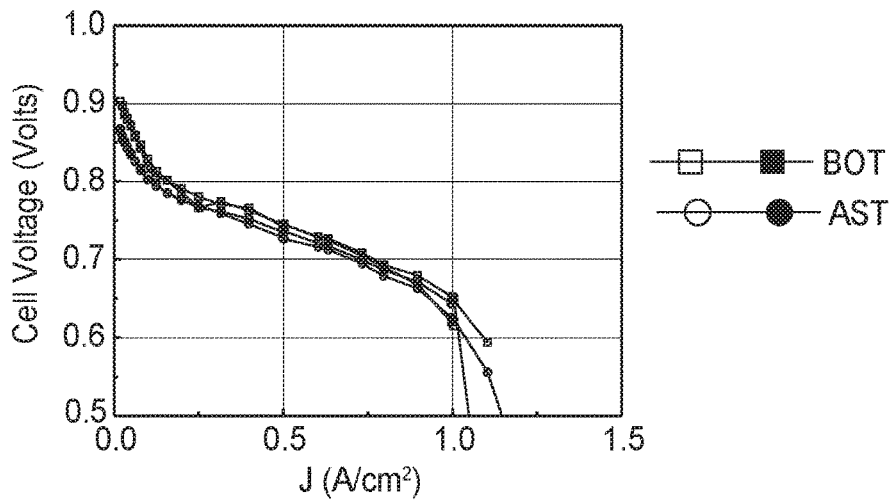
FIG. 10A is a set of fuel cell performance curves of Comparative Example B, measured before and after a durability test.

After the additional compositional and structural analysis, the catalyst was assembled into fuel cells and evaluated for BOL performance and AST durability as described for Example 1. Catalyst performance and durability metrics evaluated in fuel cell testing are provided in Table 6, below. H$_2$/Air polarization curves, taken before the AST ("BOT") and after the AST ("AST"), are shown in FIG. 10A.

TABLE 5

| Example | Number of FCC Phases | FCC Phase 1 (111) Apparent Crystallite Size, Å | FCC Phase 1 (111) Lattice Parameter, Å | FCC Phase 2 (111) Apparent Crystallite Size, Å | FCC Phase 2 (111) Lattice Parameter, Å |
|---|---|---|---|---|---|
| Comp. Ex. B | 1 | 106 | 3.694 | — | — |
| Comp. Ex. B | 1 | 108 | 3.692 | — | — |
| Comp. Ex. C | 2 | 149 | 3.689 | 43 | 3.766 |
| Comp. Ex. C | 2 | 145 | 3.692 | 44 | 3.787 |
| Comp. Ex. C | 2 | 146 | 3.697 | 45 | 3.78 |
| Comp. Ex. C | 2 | 152 | 3.691 | 44 | 3.769 |
| Ex. 9 | 2 | 144 | 3.687 | 44 | 3.819 |
| Ex. 9 | 2 | 146 | 3.689 | 45 | 3.814 |
| Ex. 9 | 2 | 145 | 3.688 | 44 | 3.815 |
| Ex. 9 | 2 | 148 | 3.688 | 41 | 3.815 |

TABLE 6

| Example | Process | Ir Content at. % | Specific Area m²/g$_{PGM}$ | % Change | ORR Mass Activity A/mg$_{PGM}$ | % Change | H$_2$/Air Performance @ 0.02 A/cm² Volts | Change |
|---|---|---|---|---|---|---|---|---|
| Comp. Ex. B | None | 0 | 14.3 | −39.6 | 0.297 | −54.2 | 0.903 | −0.037 |
| Comp. Ex. C | Dealloyed | 0 | 13.3 | −39.7 | 0.287 | −63.6 | 0.902 | −0.042 |
| Ex. 9 | Dealloyed, Ir top layer | 3.7 | 12.9 | −32.4 | 0.215 | −42.4 | 0.896 | −0.022 |

Comparative Example C

Comparative Example C was generally prepared and analyzed as described for Comparative Example B, except that the Pt$_3$Ni$_7$ catalyst was dealloyed after deposition. The electrocatalyst on MCTS was placed in contact with a gold-plated mesh electrode and installed into a custom laboratory electrochemical dealloying cell. The cell's counter electrode consisted of platinized titanium. The cell's reference electrode was an Hg/HgSO$_4$ electrode. Aqueous sulfuric acid solution (1 M, RT, aq.) was the electrolyte. The catalyst's potential was cycled several times between 0 and 1.2 V-1.4 V vs. standard hydrogen electrode with a scan rate of 50 mV/sec. Composition analysis by XRF was conducted after dealloying.

Figure 6A:
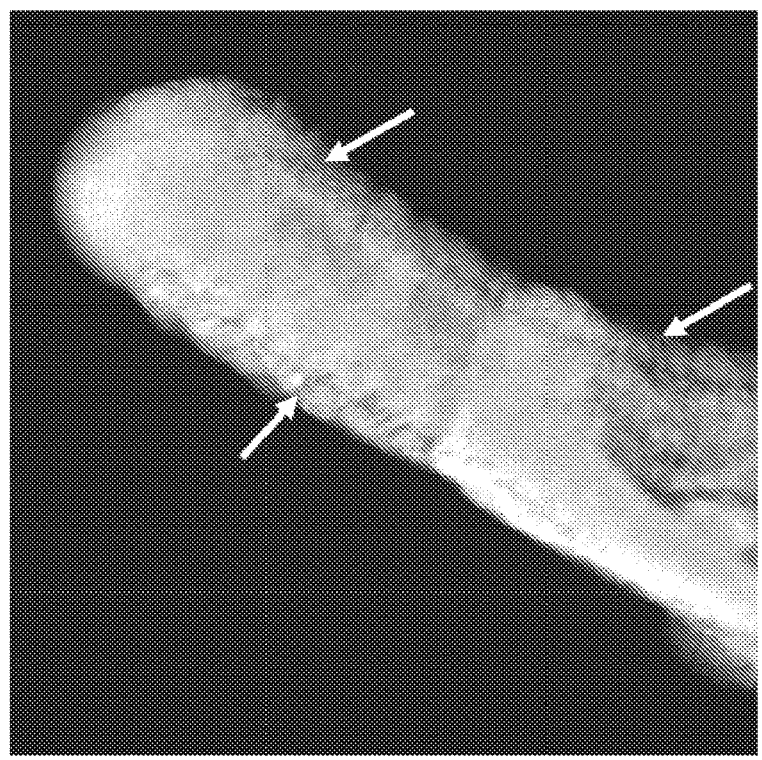
FIG. 6A is a transmission electron micrograph of Comparative Example C at 225,000×.
Figure 6B:
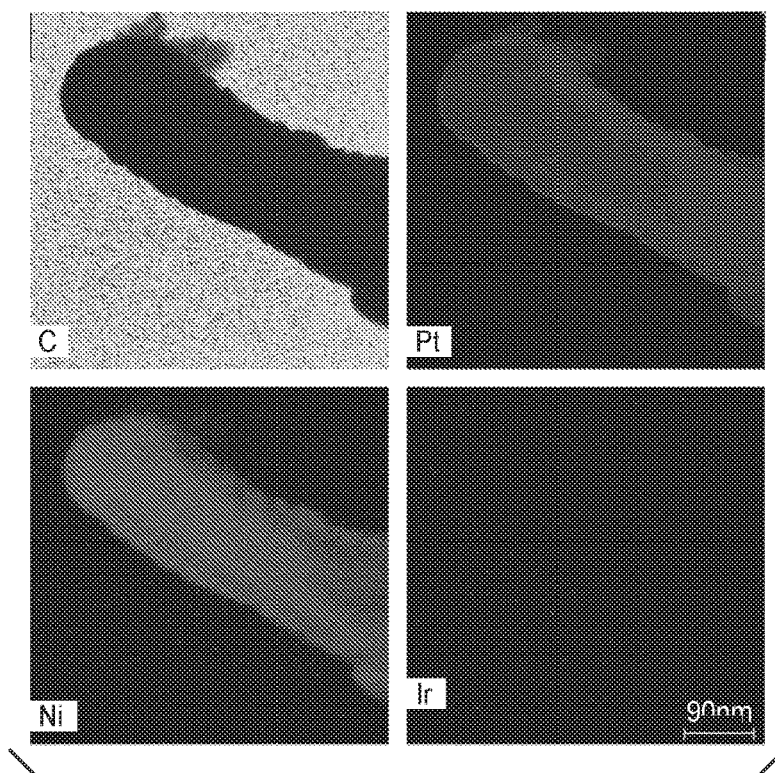
FIG. 6B is a set of energy dispersive spectroscopy elemental composition maps of Comparative Example C.
Figure 8C:
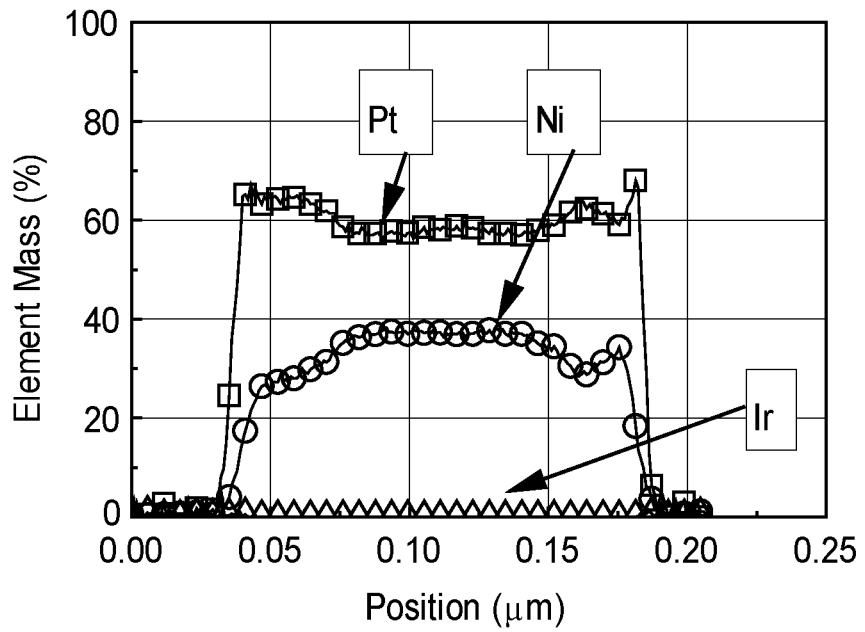
FIG. 8C is a linear composition profile of Comparative Example C, taken through the entire thickness of a catalyzed whisker, expressed as element mass percent.
Figure 8D:
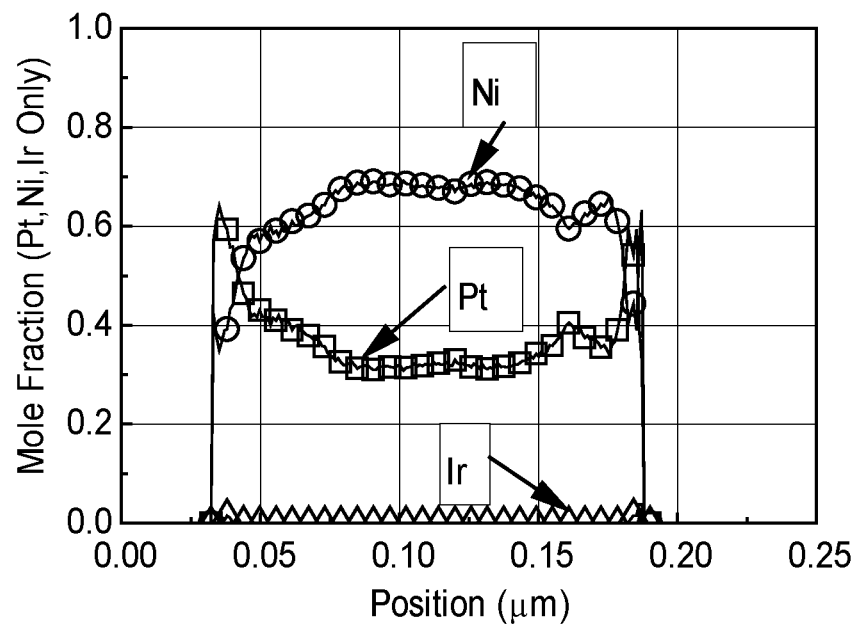
FIG. 8D is a linear composition profile of Comparative Example C, taken through the entire thickness of a catalyzed whisker, expressed as element mole fraction.
Figure 10B:
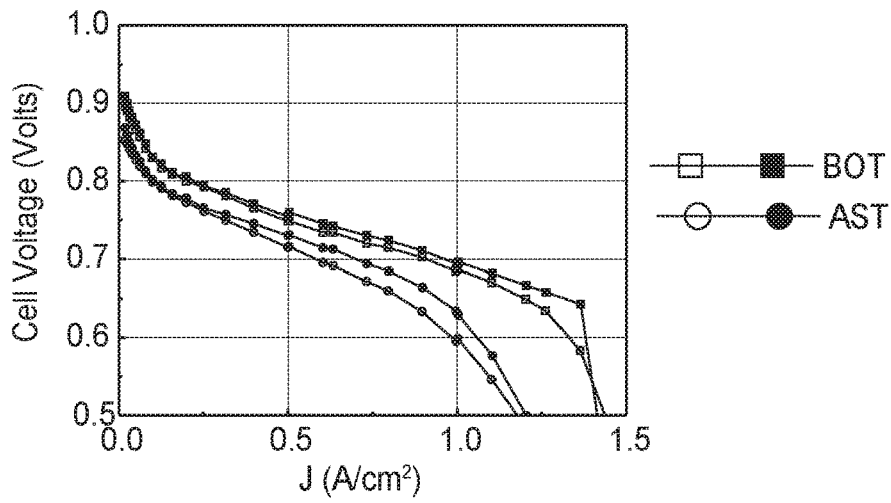
FIG. 10B is a set of fuel cell performance curves of Comparative Example C, measured before and after a durability test.

Loading and composition information is provided in Table 4, above. Catalyst performance and durability metrics evaluated in fuel cell testing are provided in Table 6, above. Four representative sections were analyzed by XRD. A representative XRD spectra for Comparative Example C is shown in FIG. 9. Table 5 provides (111) grain sizes and lattice constants for the phase(s) detected in the four representative catalyst sections analyzed by XRD. A dark field TEM image of Comparative Example C is shown in FIG. 6A; arrows denote regions where nanometer-scale pores are evident. A set of EDS element maps for C, Pt, Ni, and Ir, taken of the same area as FIG. 6A, showing the spatial distribution of elements is shown in FIG. 6B. A linear composition profile through the entire thickness of a catalyzed whisker detected by EDS, plotted as element weight percentage, is shown in FIG. 8C. A linear composition profile through the entire thickness of a catalyzed whisker, calculated as Pt, Ni, and Ir mole fractions from the Pt, Ni, and Ir weight percentage data shown in FIG. 8C, is shown in FIG. 8D. H$_2$/Air polarization curves, taken before the AST ("BOT") and after the AST ("AST"), are shown in FIG. 10B.

Example 9

Example 9 was generally prepared and analyzed as described for Comparative Example C, except that Ir was deposited onto the surface after dealloying. The dealloyed electrocatalyst was reloaded into the sputter deposition system and a single layer of Ir was deposited onto the surface, with an areal loading of 0.01 mg$_{Ir}$/cm².

Figure 7A:
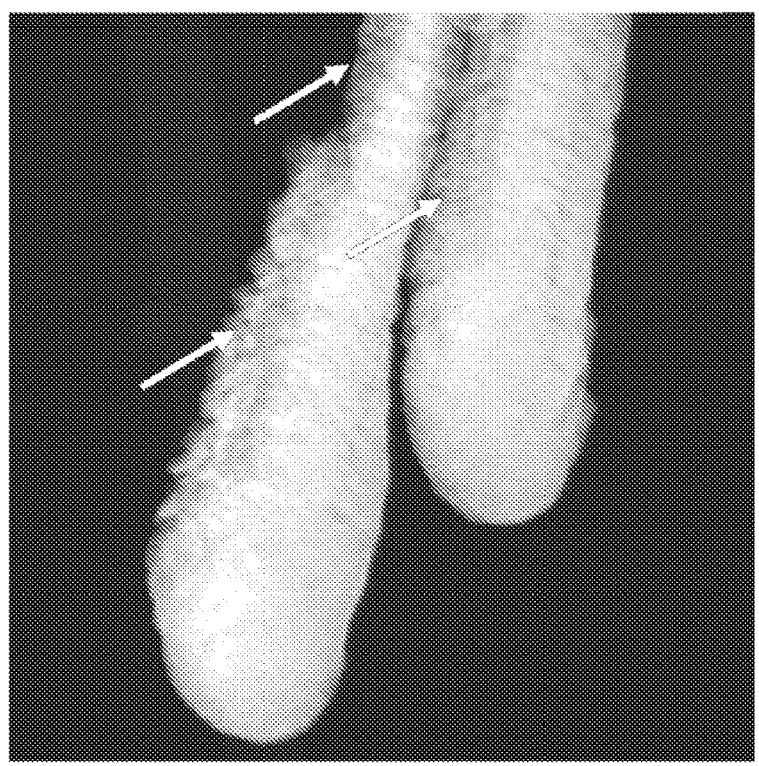
FIG. 7A is a transmission electron micrograph of Example 9 at 225,000×.
Figure 7B:
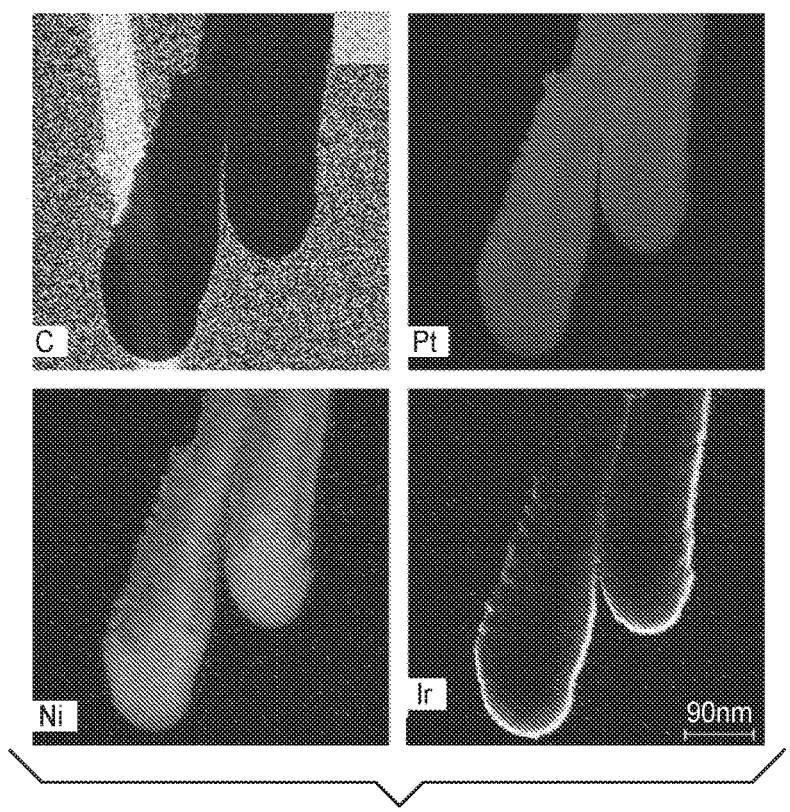
FIG. 7B is a set of energy dispersive spectroscopy elemental composition maps of Example 9.
Figure 8E:
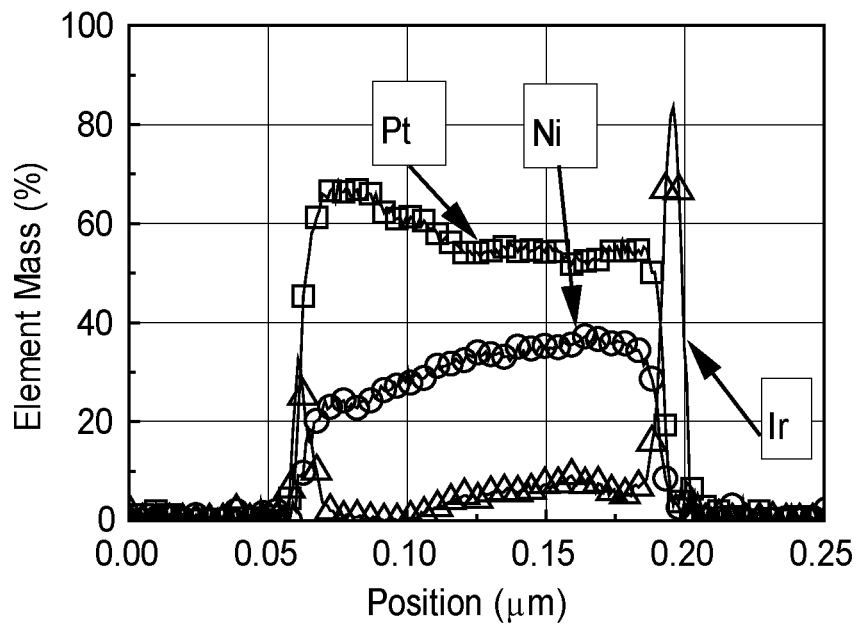
FIG. 8E is a linear composition profile of Example 9, taken through the entire thickness of a catalyzed whisker, expressed as element mass percent.
Figure 8F:
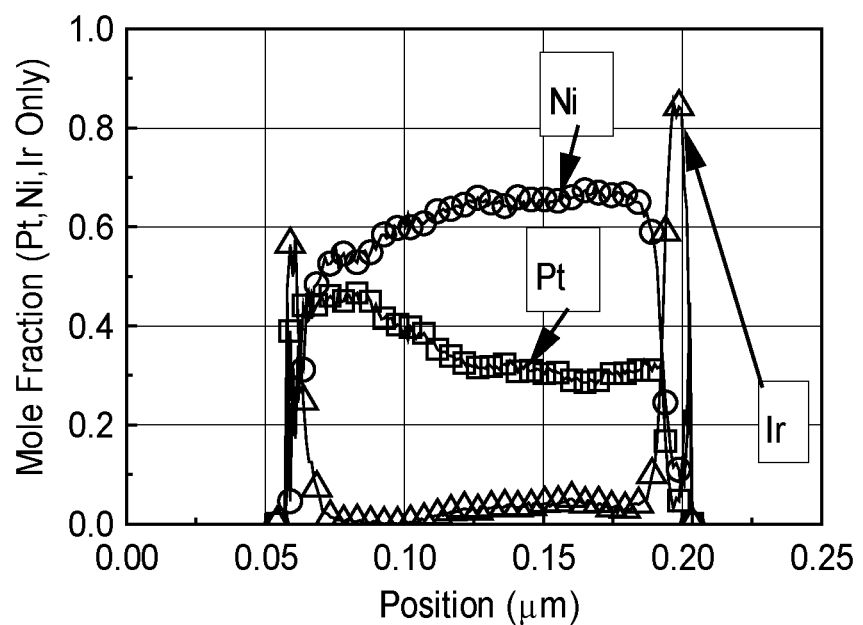
FIG. 8F is a linear composition profile of Example 9, taken through the entire thickness of a catalyzed whisker, expressed as element mole fraction.
Figure 10C:
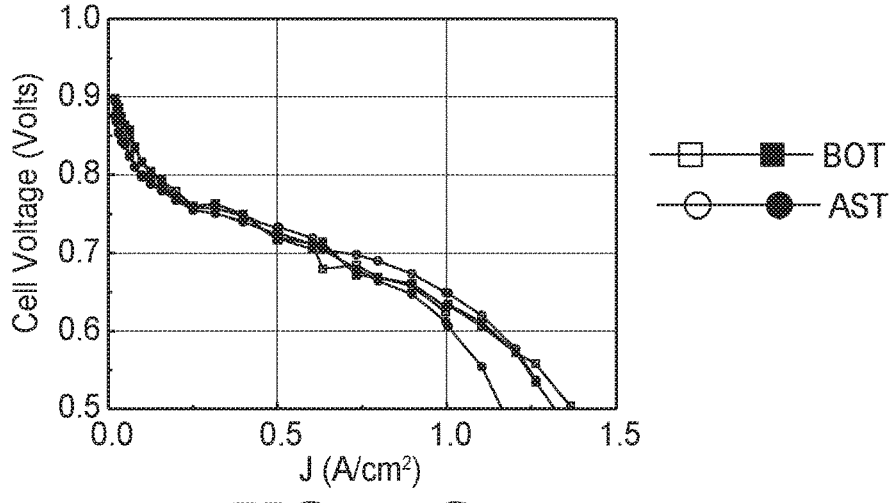
FIG. 10C is a set of fuel cell performance curves of Example 9, measured before and after a durability test.

Loading and composition information is provided in Table 4, above. Catalyst performance and durability metrics evaluated in fuel cell testing are provided in Table 6, above. Four representative sections were analyzed by XRD. A representative XRD spectra for Example 9 is shown in FIG. 9. Table 5, above, provides (111) grain sizes and lattice constants for the phase(s) detected in the four representative catalyst sections analyzed by XRD. A dark field TEM image of Example 9 is shown in FIG. 7A; arrows denote regions where nanometer-scale pores are evident. A set of EDS element maps for C, Pt, Ni, and Ir, taken of the same area as FIG. 7A, showing the spatial distribution of elements, is shown in FIG. 7B. A linear composition profile through the entire thickness of a catalyzed whisker detected by EDS, plotted as element weight percentage, is shown in FIG. 8E. A linear composition profile through the entire thickness of a catalyzed whisker, calculated as Pt, Ni, and Ir mole fractions from the Pt, Ni, and Ir weight percentage data shown in FIG. 8E, is shown in FIG. 8F. H$_2$/Air polarization curves, taken before the AST ("BOT") and after the AST ("AST"), are shown in FIG. 10C.

Comparative Example D

Comparative Example D was generally prepared as described for Comparative Example A, except that independent single element Pt and Ni targets were used instead of a single alloy target, and the catalyst was subsequently annealed. A single Pt layer with planar equivalent thickness of about 2.3 nm was first deposited onto the whiskers on MCTS from a pure Pt target (obtained from Materion, Mayfield Heights, Ohio). Next, a single Ni layer with planar equivalent thickness of about 3.9 nm was deposited from a pure Ni target (obtained from Materion). The Pt and Ni deposition processes were repeated several times, resulting in an areal loading of about 0.12 mg$_{Pt}$/cm². The targeted individual Pt and Ni layer thicknesses were calculated to yield an overall composition of 30 at. % Pt and 70 at. % Ni for the combined layers. Pt$_x$Ni$_y$ catalysts deposited from individual single element Pt and Ni targets are referred to as "multi target" (MT).

After deposition, the electrocatalyst was thermally annealed. Electrocatalyst on MCTS was placed into a quartz tube furnace (obtained under the trade designation "LINDBERG BLUE M" from Thermo Electron Corporation, Waltham, Mass.) and heated to 430° C. under flowing H$_2$. After about a 20-minute temperature ramp, the catalyst was annealed for about 3 hours at temperature, and then allowed to cool to room temperature over about a 3-hour period. After cooling to room temperature, the tube furnace was purged with nitrogen for about 15 minutes to remove any remaining H$_2$, after which the catalyst on substrate was removed from the furnace. The annealed catalyst was then fabricated into a CCM and as described for Example 1.

Figure 11A:
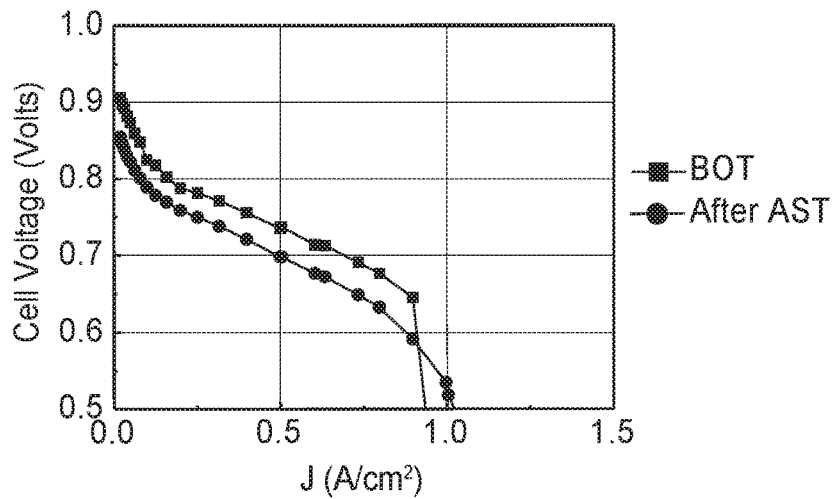
FIG. 11A is a set of fuel cell performance curves of Comparative Example D, measured before and after a durability test.

Comparative Example D was analyzed as described for Example 1. Loading and composition information is in Table 7, below. Catalyst performance and durability metrics are provided in Table 8, below. H$_2$/Air polarization curves, taken before the AST ("BOT") and after the AST ("After AST"), are shown in FIG. 11A.

TABLE 7

| Example | PtNi Deposition | Ir Incorporation | Loading, mg/cm² | | | | Composition, at. % | | | Pt:Ir Weight Ratio |
|---|---|---|---|---|---|---|---|---|---|---|
| | | | Pt | Ni | Ir | PGM | Pt | Ni | Ir | |
| Comp. Ex. D | MT | none | 0.122 | 0.086 | 0.000 | 0.122 | 30.0 | 70.0 | 0.0 | Infinite |
| Ex. 10 | MT | Bilayer | 0.0850 | 0.059 | 0.021 | 0.1059 | 28.1 | 64.9 | 7.0 | 4.0 |
| Ex. 11 | MT | Bilayer | 0.0850 | NA | 0.021 | 0.1059 | NA | NA | NA | 4.0 |

TABLE 8

| Example | Ir Incorporation | Ir Content (mg/cm²) | Specific Area | | ORR Mass Activity | | $H_2$/Air Performance | |
|---|---|---|---|---|---|---|---|---|
| | | | $m^2/g_{PGM}$ | % Change | $A/mg_{PGM}$ | % Change | Volts | Change |
| Comp. Ex. D | none | 0 | 17.5 | −46.5 | 0.327 | −62.3 | 0.905 | −0.050 |
| Ex. 10 | Bilayer | 0.021 | 12.9 | +71.4 | 0.110 | +49.6 | 0.838 | +0.042 |
| Ex. 11 | Bilayer | 0.021 | 17.7 | −1.4 | 0.183 | −6.4 | 0.884 | −0.004 |

Example 10 was generally prepared as described for Comparative Example D, except that Ir metal was also incorporated and the Pt and Ni loading was reduced. A single Pt layer with planar equivalent thickness of about 1.6 nm was first deposited from a pure Pt target (obtained from Materion, Mayfield Heights, Ohio). Next, a single Ni layer with planar equivalent thickness of about 2.6 nm was deposited from a pure Ni target (obtained from Materion). Next, a single Ir layer with planar equivalent thickness of about 0.4 nm was deposited from a pure Ir target (obtained from Materion). The Pt, Ni, and Ir deposition processes were repeated several times, resulting in an areal loading of about 0.085 $mg_{Pt}/cm^2$. The catalyst was then annealed and fabricated into a CCM as described for Comparative Example D.

Figure 11B:
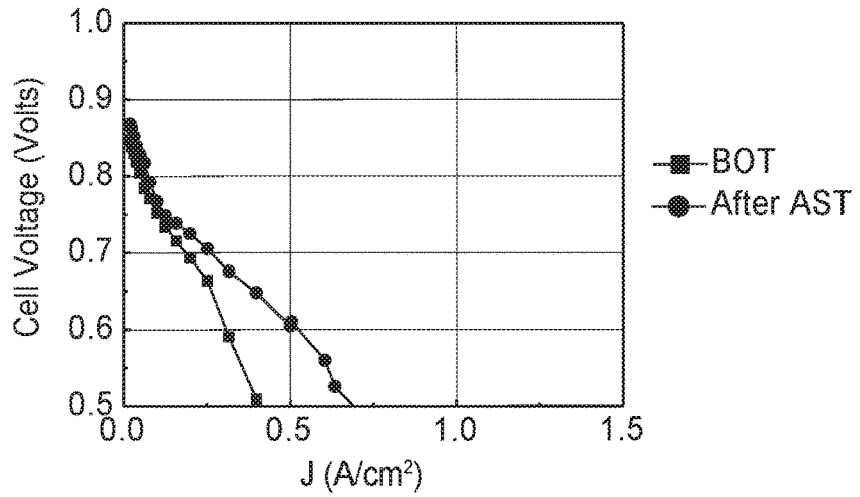
FIG. 11B is a set of fuel cell performance curves of Example 10, measured before and after a durability test.

Example 10 was analyzed analogously to Comparative Example D. Loading and composition information is in Table 7, above. Catalyst performance and durability metrics are provided in Table 8, above. $H_2$/Air polarization curves, taken before the AST ("BOT") and after the AST ("After AST"), are shown in FIG. 11B.

Example 11

Example 11 was generally prepared as described for Example 10, except that the catalyst was dealloyed after annealing, using the method described for Comparative Example C.

Figure 11C:
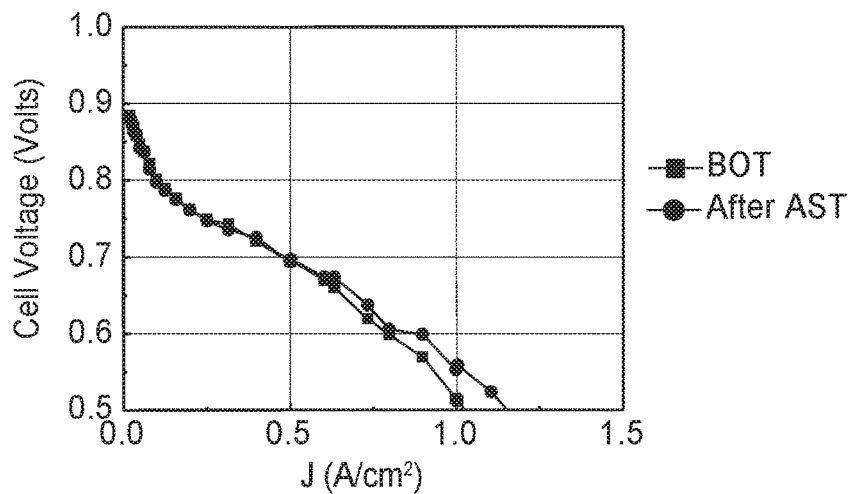
FIG. 11C is a set of fuel cell performance curves of Example 11, measured before and after a durability test.

Example 11 was analyzed as described for Example 10, except that XRF composition analysis was not done after dealloying. Table 7, above, lists the Pt and Ni loadings and Pt:Ir weight ratio for Example 11, estimated from Example 10. Without being bound by theory, dealloying predominantly removes Ni from PtNiIr catalyst, so the Pt and Ni loadings and Pt:Ir weight ratios are unchanged from the input material (Example 10). Catalyst performance and durability metrics are provided in Table 8, above. $H_2$/Air polarization curves, taken before the AST ("BOT") and after the AST ("After AST"), are shown in FIG. 11C.

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. A method comprising:
providing an oxygen reduction catalyst material comprising PtNiIr, wherein there are layers comprising platinum and nickel; and
dealloying at least some layers comprising platinum and nickel to remove nickel from at least one layer to provide a nanoporous oxygen reduction catalyst material having the formula $Pt_xNi_yIr_z$,
wherein x is in a range from 26.6 to 47.8, y is in a range from 48.7 to 70, and z is in a range from 1 to 11.4, and
wherein the nanoporous oxygen reduction catalyst material has an exposed iridium surface layer.

2. The method of claim 1, further comprising annealing the oxygen reduction catalyst material before dealloying.

3. The method of claim 1, further comprising depositing platinum and nickel from a target comprising platinum and nickel and depositing iridium from a target comprising iridium.

4. The method of claim 1, further comprising depositing platinum from a target comprising platinum, depositing nickel from a target comprising nickel, and depositing iridium from a target comprising iridium.

5. A method of making a nanoporous oxygen reduction catalyst material comprising the formula $Pt_xNi_yIr_z$, where x is in a range from 26.6 to 47.8, y is in a range from 48.7 to 70, and z is in a range from 1 to 11.4, and the nanoporous oxygen reduction catalyst material having an exposed iridium surface layer, the method comprising:
depositing platinum and nickel from a target comprising platinum and nickel to provide a first layer comprising platinum and nickel;
depositing a layer comprising iridium from a target comprising iridium;
repeating the preceding two steps, in order, at least once to create a layered material; and
dealloying at least one layer comprising platinum and nickel to remove nickel from the layer.

6. The method of claim 5, further comprising annealing the layered material before dealloying.

* * * * *